US010366273B2

(12) United States Patent
Reinhold et al.

(10) Patent No.: US 10,366,273 B2
(45) Date of Patent: Jul. 30, 2019

(54) DEVICE FOR THE CONTACT-BASED SIMULTANEOUS CAPTURE OF PRINTS OF AUTOPODIA

(71) Applicant: JENETRIC GmbH, Jena (DE)

(72) Inventors: Joerg Reinhold, Jena (DE); Dirk Morgeneier, Jena (DE); Daniel Krenzer, Wutha-Farnroda (DE); Juergen Hillmann, Jena (DE); Philipp Riehl, Jena (DE); Undine Richter, Jena (DE)

(73) Assignee: JENETRIC GmbH, Jena (DE)

( * ) Notice: Subject to any disclaimer, the term of this patent is extended or adjusted under 35 U.S.C. 154(b) by 0 days.

(21) Appl. No.: 16/117,061

(22) Filed: Aug. 30, 2018

(65) Prior Publication Data
US 2019/0065816 A1   Feb. 28, 2019

(30) Foreign Application Priority Data

Aug. 31, 2017 (DE) .................. 10 2017 119 983

(51) Int. Cl.
*G06K 9/20* (2006.01)
*F21V 8/00* (2006.01)
*G06K 9/00* (2006.01)

(52) U.S. Cl.
CPC .......... *G06K 9/0004* (2013.01); *G02B 6/0031* (2013.01); *G02B 6/0055* (2013.01);
(Continued)

(58) Field of Classification Search
CPC ............. G06K 9/0004; G06K 9/00046; G06K 9/00053; G06K 9/2017; G06K 9/209;
(Continued)

(56) References Cited

U.S. PATENT DOCUMENTS 4,729,068 A    3/1988  Ohe
6,647,133 B1  11/2003  Morita et al.
(Continued)

FOREIGN PATENT DOCUMENTS

CN   108021845 A    5/2018
DE   36 34 493 A1   4/1988
(Continued)

OTHER PUBLICATIONS

Office Action, for German Patent Application No. 10207119983.7, dated May 18, 2018, with English translation, 6 pages.
(Continued)

*Primary Examiner* — Anh T Mai
*Assistant Examiner* — Nathaniel J Lee
(74) *Attorney, Agent, or Firm* — Christensen, Fonder, Dardi & Herbert PLLC

(57) ABSTRACT

A device for contact-based capture of human autopodial prints using disturbed total internal reflection, comprising a protective body with a contact surface, a sensor layer comprising light-sensor elements in an array for detecting light of a predefined wavelength range, and a light guide. Passband areas transparent for light of the predefined range are between the sensor elements. The light guide is transparent to light in the range and includes parallel lower and upper faces. The faces define a coupling-in surface for light emitted from a light source in a limited angular range around a preferred direction. Due to the directed angle of incidence, light entering the light guide is totally internally reflected at the faces. A mirror layer between the sensors and the guide reflects some light back into the light guide and transmits other light. Light exiting the guide is homogenized dependent upon a distance to the light source.

41 Claims, 13 Drawing Sheets

(52) U.S. Cl.
    CPC ......... *G02B 6/0061* (2013.01); *G02B 6/0065* (2013.01); *G02B 6/0068* (2013.01); *G06K 9/00046* (2013.01); *G06K 9/00053* (2013.01); *G06K 9/209* (2013.01); *G06K 9/2027* (2013.01)

(58) Field of Classification Search
    CPC .. G02B 6/0031; G02B 6/0065; G02B 6/0068; G02B 6/0055; G02B 6/0061
    See application file for complete search history.

(56) References Cited

U.S. PATENT DOCUMENTS

| | | | |
|---|---|---|---|
| 9,245,167 | B2 | 1/2016 | Carver et al. |
| 2001/0017774 | A1 | 8/2001 | Ito et al. |
| 2003/0020028 | A1 | 1/2003 | Iihama et al. |
| 2004/0022050 | A1* | 2/2004 | Yamashita ........... G02B 6/0021 362/615 |
| 2009/0185722 | A1 | 7/2009 | Kajihara et al. |
| 2012/0019877 | A1 | 1/2012 | Yamaguchi et al. |
| 2012/0176682 | A1 | 7/2012 | DeJong |
| 2012/0206817 | A1 | 8/2012 | Totani et al. |
| 2013/0082980 | A1 | 4/2013 | Gruhlke et al. |
| 2013/0120760 | A1 | 5/2013 | Raguin et al. |
| 2014/0098306 | A1 | 4/2014 | King et al. |
| 2014/0205160 | A1 | 7/2014 | Chang et al. |
| 2016/0254312 | A1 | 9/2016 | Lee et al. |
| 2017/0085813 | A1 | 3/2017 | Reinhold et al. |
| 2017/0132447 | A1* | 5/2017 | Reinhold ........... G06K 9/00013 |
| 2017/0212293 | A1 | 7/2017 | Kim et al. |

FOREIGN PATENT DOCUMENTS

| | | |
|---|---|---|
| EP | 3 040 231 A2 | 7/2016 |
| EP | 3 147 823 A2 | 3/2017 |
| JP | 2003-281920 A | 10/2003 |
| WO | WO2001036905 | 5/2001 |
| WO | WO2007115589 | 10/2007 |
| WO | WO2008033265 | 3/2008 |
| WO | WO2011059496 | 5/2011 |

OTHER PUBLICATIONS

Response to Office Action, for German Patent Application No. 10207119983.2, filed with the German Patent Office Jun. 12, 2018, English translation, 8 pages.

* cited by examiner

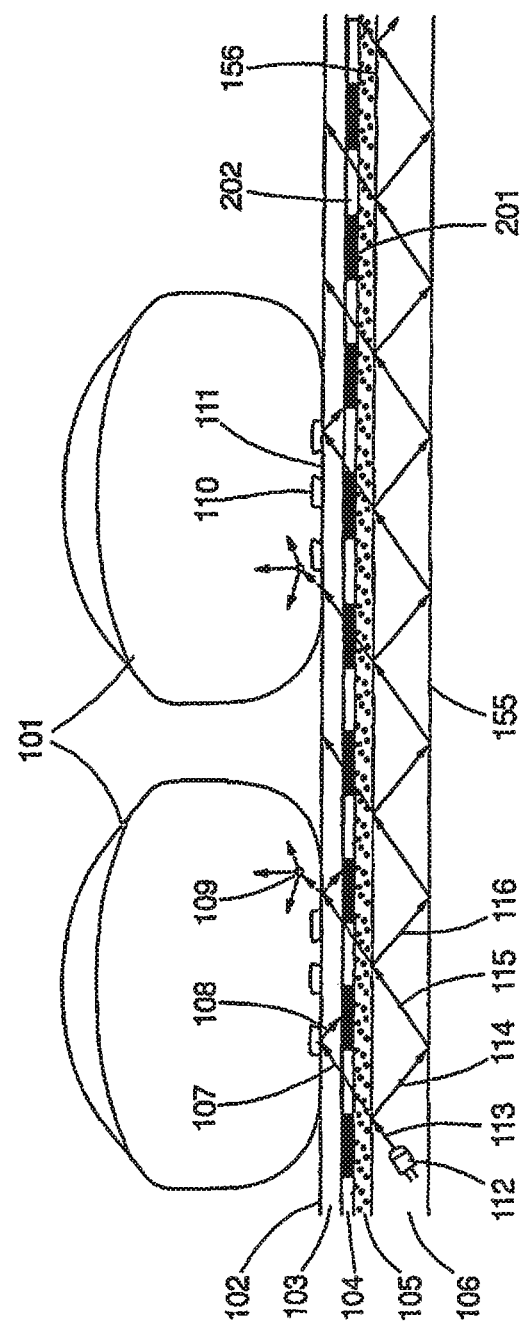

US 10,366,273 B2

DEVICE FOR THE CONTACT-BASED SIMULTANEOUS CAPTURE OF PRINTS OF AUTOPODIA

PRIORITY CLAIM

The present application claims priority to German Patent Application No. 10 2017 119 983.7, filed on Aug. 31, 2017, which said application is incorporated by reference in its entirety herein.

FIELD OF THE INVENTION

The invention relates to a device for the contact-based simultaneous capture of prints of several areas of skin of human autopodia supplied with blood, by means of disturbed total internal reflection.

BACKGROUND OF THE INVENTION

The identification and recording of people via biometric features is becoming increasingly important. Alongside other biometric features, fingerprints play an important role. On the one hand, there are systems which are used to verify biometric features in which there must therefore be a match with stored features, for example in order to enable entry or access control. Other systems are used for identification by searching and storing in reference databases, for example in the case of border controls at airports or in the case of identity-recording by the police. For the latter systems there is a large number of requirements in terms of the quality, the resolution and the faithfulness to the original of the captured images of the skin textures. Not least because of the high demands of organizations entrusted with identity-recording measures, such as for example the Federal Bureau of Investigation (FBI), there is a high degree of standardization with these systems in order, on the one hand, to ensure as definite an identification as possible and, on the other hand, to make data sets which were captured by different systems comparable. For example, such systems must have a resolution of at least 500 ppi (points per inch), which corresponds to a pitch of the sensor elements of 50.8 μm. In addition, particular demands are made on the contrast transfer function (CTF), the signal-to-noise ratio (SNR) and the distortion. Finally, the grey scale must comprise at least 200 greyscale values and the image field must be illuminated as homogeneously as possible both in the immediate vicinity of the pixel and in the image as a whole.

All of the demand criteria require a balanced and high-quality system design. In the case of an optical system, this means, for example, that not only the acquisition sensor or acquisition sensors must satisfy the demands but also the illumination and all of the other components necessary for the image generation.

For recording finger- and handprints which fulfil the named high quality demands, at the present time, optical arrangements are predominantly used which operate according to the principle of disturbed total internal reflection. For this, a prism is applied, the surface of which provided for capturing the print must be larger than the surface required for capturing the print because of mechanical and optical demands. The size of the prism resulting from this often as a larger component in the capturing channel has a decisive influence on the minimum overall size and the minimum weight of a device.

On the other hand, however, the high image quality permits a rapid and reliable recording and identification of people, in particular even in the case of applications where, in addition to forensic accuracy, a high throughput of people also plays a role, for example in the case of border controls. In addition to the overall size and the weight, it is also disadvantageous that the use of complex mechanical components is necessary; moreover calibration and assembly are highly technically complex and time-consuming.

In order to combine the advantage of high image quality which can be achieved with disturbed total internal reflection with small, in particular flat, overall size, approaches are described, for example, in U.S. Pat. No. 9,245,167 B2. The fingerprint sensor disclosed there, in which the finger is placed on a TFT display (thin-film transistor display), captures a fingerprint and transmits this via an electronic system to a computer system. The brightness profile corresponding to the fingerprint forms—as in the case of arrangements with prisms—in that the epidermal ridges, the so-called papillary ridges, lying on the surface of the TFT display disturb the internal reflection of the light from the light source, while in the valleys between the papillary ridges, i.e. the epidermal valleys or papillary valleys, no contact occurs between skin and TFT display surface and there the light from the light source is reflected internally at the surface of the TFT display. A negative image of the fingerprint forms in this way on the light-sensitive areas of the TFT display. On the one hand, this solution assumes that the distance between the light-sensitive areas in the TFT display and the contact surface has a minimum size so that the light can strike the light-sensitive areas of the TFT. On the other hand, the illumination must fulfil certain requirements with regard to the direction of incidence and aperture angle.

U.S. Pat. No. 9,245,167 B2 discloses various possibilities as to how an illumination can be realized. One possibility consists of a light guide, arranged below the sensor layer, into which light is coupled from the side, which is coupled into the sensor layer from there. Because the device described there is designed for the examination of a single finger, the light guide can be kept relatively compact, with the result that a fall-off in the illuminance as the distance from the light source increases does not become disruptively noticeable. In the case of larger contact surfaces which are provided for the placement of several autopodia or a whole hand, however, the illuminance decreases with the result that the autopodia located at the edge are no longer correctly illuminated or their images are no longer completely usable due to a reduced contrast. In order also to obtain a sufficient illuminance for the finger placed on furthest from the light source, a powerful light source is required which, however, leads to the fingers which are closest to the light source being illuminated with excessive intensity, which also has an adverse effect on the contrast or leads to overexposure of these areas. An illumination which is optimal for these autopodia means, in contrast, that the autopodia which are placed on furthest from the light source are underexposed and can thus also not be represented. However, this type of illumination is not used with disturbed total internal reflection (TIR) in U.S. Pat. No. 9,245,167 B2; for such cases the use of a microprism array arranged between light guide and sensor layer is proposed when the light source is arranged below the sensor layer.

In other arrangements, the light is also coupled directly into a prism structure arranged above the sensor layer and above a cover glass. Another embodiment described in U.S. Pat. No. 9,245,167 B2 uses light sources which are arranged between the light-sensitive sensor elements; here, however, total internal reflection is not used for the image capture. This embodiment can also be used in conjunction with the scanning of a document.

When a microprism array is used, double images can form due to reflections in the light guide itself, furthermore parasitic scattered light from the surroundings can impair the image quality. In the case of the methods described in U.S. Pat. No. 9,245,167 B2, the protective layer on the sensor layer has to be kept as thin as possible since otherwise diffuse light generates optical crosstalk, which reduces the resolution. By this is meant the case where light from different angles of incidence strikes the same area of the contact surface and in the process records the same or very similar items of information about the finger placed on or not placed on at this specific point, but is also emitted at different angles of reflection due to the different angles of incidence and thus detected at various points, with the result that the resolution is impaired.

Further fingerprint scanners which operate according to the principle of disturbed total internal reflection with prisms, objective lenses and sensors are known in the state of the art, for example from U.S. Pat. No. 6,647,133 B1, from WO 2011/059496 A1 or from WO 2007/115589 A1. An optical fingerprint scanner with a touch-sensitive surface and an illumination via a light guide is described in WO 2008/033265 A2. Capacitive TFT sensors with a touch-sensitive control system are likewise known, for example from WO 2001/36905 A1 or from the already named U.S. Pat. No. 9,245,167 B2.

As already mentioned, prism devices are significantly larger and heavier than direct scanners, in particular when they are dimensioned for the simultaneous capture of several fingers. The calibration has to be effected very accurately, which is technically complex. Also ruled out is user guidance directly in the capture area of the skin prints. The capture of documents is also not possible using this principle.

Direct optical fingerprint scanners only work with a small distance between sensor element and skin surface, namely with distances of less than 25 µm. Although a robust encapsulation of the sensor/pixel structures can be achieved by means of such thin cover glass, the robustness against external mechanical influences is however reduced compared with thicker cover glasses. If an at least partially transparent coating is used instead of glass or ceramic, the stability vis-à-vis electrostatic discharges (ESD stability) is reduced compared with glass, and in addition such a protective layer only has a lower hardness and abrasion resistance than glass or ceramic. Such devices are therefore less suitable for scanning documents. Although glass with a thickness of less than 30 µm is commercially available and suitable for series production, it is however complex to process on large contact surfaces; in particular bubble-free optical bonding is challenging. Transparent ceramics in this small thickness are not available in series production. In principle the use of a thicker glass cover layer would be desirable, however this is accompanied by the associated reduced resolution described at the beginning.

Capacitive devices on the other hand cannot be used for the capture of documents; in addition the sensors are usually not transparent with the result that to date neither user guidance nor user feedback has been realized in the capture surface by a display mounted below it.

SUMMARY OF THE INVENTION

An embodiment device comprises, from the direction of an area of skin that is to be placed on, for example from the direction of a person who places a finger or a hand on a fingerprint sensor, a protective body of predefined thickness with a contact surface for placing on at least one area of skin, wherein the contact surface has a size which makes possible the simultaneous placement of several autopodia, as a rule several fingers. The device also comprises a sensor layer which can itself be part of a layer system. The sensor layer comprises light-sensitive sensor elements, arranged in the form of an array, for detecting light of at least one predefined wavelength range. Passband areas which are transparent for light of at least one predefined illumination wavelength range are arranged between the sensor elements, which are also referred to as pixels. Finally, the device also comprises a light guide made of a material that is transparent for light of the predefined illumination wavelength range. The light guide is designed in the form of a plane-parallel plate and has a lower large face and an upper large face arranged parallel thereto; the upper large face faces the sensor layer. Corresponding to the shape of a plane-parallel plate, the light guide also has several edges connecting the large faces to each other; the light guide itself is as a rule constructed as a solid glass or plastic body. One of the edges of the light guide is formed as a coupling-in surface for illumination light. For this a light source emits illumination light along a longitudinal direction of the coupling-in surface, i.e. it extends along this longitudinal direction and emits the light onto the coupling-in surface. The longitudinal direction of the edge refers to a direction which lies parallel to the planes of the large faces.

An object of the invention is to further develop a device of the type described at the beginning for capturing fingerprints to the effect that on the one hand the prints of several autopodia can be captured simultaneously, on the other hand thicker protective bodies such as cover glasses can be used, which optionally also allow documents to be scanned. The contact surface should be flat; in particular the device must be capable of achieving an image quality according to the quality requirements specified by regulations for all autopodia placed on simultaneously. User guidance directly on the contact surface should in principle be possible.

This object is achieved for a device of the type described at the beginning in that the light source is designed so as to emit light in a limited angular range around a preferred direction, wherein the preferred direction makes an angle of incidence with the large faces, which is predefined such that a predominant proportion of the light which is emitted in the angular range would, after entering the light guide, be totally internally reflected at the large faces in the case of a medium with a refractive index of air in contact therewith. "Predominant" means a proportion of more than 50%. However, in order to utilize the light quantity as completely as possible the configuration is preferably chosen such that all of the light which is emitted in the angular range around the preferred angle would be totally internally reflected under the named condition.

In addition, between the sensor layer and the light guide a mirror layer is arranged which reflects one portion of the illumination light back into the light guide and transmits another portion of the illumination light. Finally, the device also comprises a homogenizer for homogenizing the illuminance of illumination light which exits the light guide through the upper large face thereof and strikes the contact surface. The device additionally or alternatively also comprises a homogenizer for homogenizing a light quantity to be detected depending on the illuminance of the illumination light from the protective body striking the contact surface.

The homogenization is effected in relation to the distance to the light source or depending on the distance thereto.

In order to implement the principle of total internal reflection, a beam propagating in the light guide must strike the upper or lower large face at a corresponding angle, at which total internal reflection is possible. The critical angle for total internal reflection is determined by the refractive indices of the two media involved; a prerequisite for the occurrence of total internal reflection is also that the refractive index of the medium in which the beam propagates is higher than that of the medium on the other side of the large face. In the present case, the light guide, on its upper large face, is joined to a further material layer, for example the mirror layer, for example in that both layers are optically coupled with a transparent adhesive, or also only laid alongside each other and clamped together, which likewise leads to a sufficient connection and sufficient boundary surface contact in the case of a highly accurately polished surface. The medium in contact with the lower large face is air.

A light beam propagating along the preferred direction first strikes the lower or upper large face—depending on the coupling-in direction. It is totally internally reflected at the lower large face and directed at the same angle in the direction of the upper large face. The medium on the other side of the upper large face is in general not air, but rather, for example, the mirror layer or another material layer. The mirror layer does not reflect 100% of the beam, but allows a fraction of the illumination light to pass through, i.e. transmits it, while another, predominant portion is reflected, with the result that the light guide can emit light over the whole extent of the large faces through the upper large face as light can penetrate the light guide as far as an end edge, i.e. an edge which lies opposite the coupling-in surface.

The transparent materials of the layer stack, in particular consisting of the mirror layer, the sensor layer and the protective body, preferably have similar refractive indices, with the result that a beam entering the medium at an angle other than zero is refracted as little as possible. This is not absolutely necessary, however it must be ensured when combining the materials that at least the light beam propagating below the preferred direction in the light guide strikes the protective body after passing through all of the media as far as the underside of the contact surface at such an angle that the beam is also totally internally reflected here if the medium air is located on the other side of the contact surface. The angle which the preferred direction makes with the normal of the large faces of the light guide therefore on the one hand has to be chosen such that total internal reflection takes place at these large faces themselves if air as medium is on the other side; on the other hand the angle also has to be chosen such that total internal reflection likewise takes place at the contact surface of the protective body after passing through all of the media which are stacked in the form of layers if air is on the other side. When a finger is placed on, the beam is not totally internally reflected, but enters the finger and is scattered in many directions, with the result that the skin particles lying thereon appear as dark spots in the image.

The different layers are preferably optically coupled to one another, for example by optical bonding. The light source emits light only in a limited angular range. In order to keep the coupling into the light guide as effective as possible and the broadening of the angular range by refraction as small as possible, the angular range which also defines an acceptance cone in the case of a substantially punctiform light source is preferably oriented symmetrical about the preferred direction wherein, in an advantageous embodiment, the normal of the coupling-in surface corresponds to this preferred direction or lies parallel to it.

The light source should advantageously be aligned such that all angles contained in the limited angular range still correspond to beams which after entering the light guide make an angle with the normals of the large faces which makes total internal reflection possible with air as adjacent medium. The size of the aperture angle also limits the possible thickness of the protective body as the diameter of an acceptance cone—in the case of a symmetrical aperture angle—becomes larger with the light path covered and the resolution is thus reduced in the case of thicker cover glasses. The smaller the angular range, the thicker the protective body can be chosen to be. LEDs are suitable as light sources that are favourable with regard to price. Particularly small aperture angle ranges can be achieved when lasers are used as light sources.

When the angular range is limited to 20°, i.e. to a ±10° deviation from the preferred direction, the thickness of the protective body can be approximately up to 0.1 mm in order still to achieve a resolution of 500 dpi when, for example, thin glass with a refractive index of 1.5 is used as protective body; other angular ranges and maximum thicknesses can result depending on the material. The light emitted by the light source is guided to the finger lying on the contact surface, wherein the angles of incidence of the light which result from the limited angular range, relative to the normal of the contact surface, are preferably all greater than the critical angle of the total internal reflection between the protective body and air, with the result that the light is reflected back onto the sensor in the papillary valleys between the papillary ridges with fingers placed on. This total internal reflection is disturbed at the papillary ridges with the result that these appear as dark areas.

The sensor is preferably an optical TFT sensor, such that fingerprints can be captured directly and in a contact-based manner, for example. The sensor is advantageously semi-transparent in order to allow as much light as possible from the light guide arranged below the sensor layer to pass through.

An important component of the device is the homogenizer means for homogenizing the illuminance of illumination light, or the homogenizer means for homogenizing a light quantity to be detected, in each case depending on the distance to the light source. By means of the homogenization it is achieved that all autopodia lying on the contact surface, for example four fingers or a whole hand, are illuminated or detected simultaneously with the same quality. This can be achieved on the one hand in that illumination light which exits the light guide through the upper large face thereof and which strikes the contact surface is homogenized, i.e. anywhere on average has the same illuminance. Another possibility consists of homogenizing not the illumination light, but rather the light to be detected or the light quantity to be detected. This can also be effected depending on the illuminance of the illumination light from the protective body striking the contact surface as this ultimately also determines the light quantity to be detected. The homogenization is effected depending on the distance to the light source. Through scattering losses and coupling-out, the illuminance or the intensity of the light which is emitted from the light guide into the sensor layer decreases as the distance from the light source increases in the case of a homogeneous mirror layer which is transparent up to a certain degree of, for example, 10%; this decrease taking place continuously for layers that are homogeneous per se. Without a homogenization layer the illuminance is therefore greater in the vicinity of the light source. The means for homogenizing the illuminance now ensure that the illuminance of the illumination light which strikes the contact surface is substantially homogeneous all over the contact surface, i.e. is constant. For this, the illuminance in the vicinity of the light guide has to be reduced to a value which corresponds to the illuminance in the areas of the contact surface furthest from the light source. The closer an area of the contact surface is to the light source, the greater the extent to which the illuminance has to be reduced at this point, whereas in the area of the furthest points on the contact surface the reduction in the illuminance is to be as small as possible or negligible. Between these two extreme positions the illuminance is correspondingly reduced, wherein on average, i.e. over a representative surface area on the contact surface, for example the size of a phalanx, the variation preferably takes place continuously and not erratically.

The device can alternatively or additionally also comprise a homogenizer for homogenizing a light quantity to be detected depending on the illuminance of the illumination light from the protective body striking the contact surface. The illumination light is then first allowed to pass through completely, and therefore illuminates the contact surface inhomogeneously and the autopodia lying closer to the light source more strongly. The homogenizer or means for homogenizing the light quantity to be detected may comprise, for example, diaphragms which are arranged above the sensor elements or light-sensitive areas thereof. The apertures of these diaphragms increase as the distance from the light source increases, with the result that the light quantity striking the light-sensitive areas of the sensor elements is regulated. The homogenizer for homogenizing the light quantity to be detected can additionally or alternatively also comprise a means to control sensitivity of the sensor elements such as a controller for varying the sensitivity of the sensor elements. The light sensitivity of the sensor elements in the vicinity of the light source is reduced or that of those further from the light source is increased, wherein the two can be combined with each other in order to obtain the best possible signal-to-noise ratio. The higher the sensitivity, the greater the light quantity that is detected. A further possibility for homogenization is the introduction of a layer between the light-sensitive sensor elements and the contact surface, which has an absorbing effect, wherein the degree of absorption at various locations of the layer is different. In the vicinity of the light source the absorption is strong; further from the light source it is less.

In a particularly preferred embodiment of the invention, the homogenizer for homogenizing the illuminance are formed on the mirror layer, i.e. the mirror layer additionally also assumes the function of a homogenization layer, in that the degree of reflection of the mirror layer decreases and the degree of transmission of the mirror layer increases as the distance from the light source increases, which can be realized in different ways. The variation of the degree of reflection or of the degree of transmission need not be effected continuously as the distance increases, but rather can also be effected more or less erratically or not at all for individual, pixel-sized areas: the requirement to decrease the degree of reflection or to increase the degree of transmission applies to areas which have a representative size in relation to the overall size of the contact surface, for example approximately 10% of the contact surface or an area the size of a finger or phalanx. The size and shape of the areas also depends on the manner in which the homogenization in the mirror layer is achieved. For example, a homogenization can be achieved by a pattern of reflecting and transmitting strips like a barcode, wherein the strips run parallel to the light source and the width of the reflecting strips decreases as the distance from the light source increases, while the width of the transmitting strips increases. In this case, a representative area in the direction away from the light source comprises at least one area which corresponds to the widest strip with the highest reflectivity and the adjacent narrowest space between with the lowest reflectivity or the highest degree of transmission. If the representative area is then gradually moved away from the light source, perpendicular to the longitudinal direction of the coupling-in surface or of the strips, the reflectivity in the representative area decreases on average—i.e. averaged over the representative area—and the transmissivity increases on average.

In order to achieve the homogenization, the mirror layer therefore preferably comprises reflecting areas and transmitting areas, wherein the proportion of the reflecting areas per unit area—or relative to an area of representative size—decreases on average with the distance from the light source and the proportion of the transmitting areas per unit area increases on average with the distance from the light source. By the expressions "per unit area" and "on average" is meant here that as the distance from the light source increases, the change can possibly also be effected erratically or not at all in the smallest, pixel-sized areas, but rather only over larger representative surface areas. The size and shape of these representative surface areas depends on the size and shape of the transmitting or reflecting areas, and can be up to a quarter of these or even more relative to the whole contact surface.

Density—by this is meant the number of areas per surface or unit area—of the reflecting areas advantageously decreases as the distance from the light source increases, while the density of the transmitting areas increases. In this case, the transmitting areas—or in another embodiment the reflecting areas—can in each case be the same size. However, it is alternatively or additionally also conceivable that the size of the reflecting areas decreases as the distance from the light source increases, while the size of the transmitting areas increases. A reflecting area has a degree of reflection significantly greater than 50% of the incident light, for example between 70% and 90%. The transmitting areas in turn should have a degree of transmission significantly greater than 50%, for example between 70% and 90%.

The areas themselves can have any desired shapes, for example circular or rectangular; other polygonal shapes are also conceivable. The areas can themselves also be delimited by irregular polygons the shape of which is predefined, for example stochastically; in this way artefacts, which can form due to regular structures, can optionally be avoided during the illumination.

Another possibility for achieving a homogenization of the illuminance with the aid of the mirror layer consists of varying the thickness of the mirror layer, wherein the thickness of the mirror layer decreases as the distance from the light source increases, this decrease preferably taking place continuously. In this way the degree of transmission of the layer is gradually increased as the distance from the light source increases. The mirror layer can then be formed wedge-shaped, for example in a cross section through the layer structure—perpendicular to the contact surface and away from the light source; to preserve the parallelism of the contact planes of the different layers it can be combined with a transparent compensation layer, also wedge-shaped.

All the layers, i.e. light guide, mirror layer, optionally a compensation layer, sensor layer and protective body, are optically coupled to each other according to their sequence in the stack. This means that there is no air layer between two layers, but two layers are in each case joined directly or by an adhesive layer, which is preferably as thin as possible; this type of connection is also referred to as optical bonding.

A further possibility for achieving the homogenization consists of using a mirror layer in which the density of a material which is essentially responsible for the reflections in the mirror layer decreases as the distance from the light source increases. This embodiment is particularly advantageous when light of only specific wavelengths is used, for example laser light.

The mirror layer can be, for example, a metal mirror and it can be produced in various ways, for example in an inkjet printing method, photolithographically, by means of PVD (physical vapour deposition) or laser ablation. The homogenization means can, however, also be realized on the mirror layer, in that the latter is designed as an interference mirror, which is in turn advantageous when only individual selected wavelengths are used.

The homogenizer for homogenizing the illuminance can, however, also comprise an absorption layer which is arranged between the mirror layer and the sensor layer or between the sensor elements in the passband areas, wherein as the distance from the light source increases the degree of absorption of the absorption layer for the illumination light decreases and the degree of transmission increases. The mirror layer can then be designed with high reflectivity throughout, with the result that a high proportion of the light is reflected up to the end of the light guide, which ensures a comparatively higher brightness there.

In order to keep the angular distribution as symmetrical as possible and as limited as possible around the preferred direction, it is advantageous for the normal of the coupling-in surface to lie parallel to the preferred direction; the coupling-in surface therefore makes an acute angle with the upper or lower large face. The angular distribution should preferably be chosen such that all angles at which light is coupled in lead to total internal reflection in order to keep the losses as low as possible and to achieve as high an image quality as possible.

In order to prevent the occurrence of double or multiple images in the area of the sensor, a suppressor or means for suppressing the formation of returning beams are formed or arranged to reduce the reflection at an edge of the light guide formed as end edge, which lies opposite the coupling-in surface in the light propagation direction. The reduction in the reflection at the end of the light guide can, for example, be achieved in that an absorbing layer is applied to this end or the edges are roughened. A further possibility which can be combined with the one named previously also consists of the addition of a chamfer similar to the coupling-in surface, i.e. the end edge is then arranged substantially perpendicular to the propagation direction of light that has entered the light guide along the preferred direction, wherein the propagation direction of the light depends on the angle of entry and, in the area of the end edge, on the extent of the light guide in the propagation direction. An embodiment with several absorption surfaces which are preferably provided with absorption layers and, in pairs in each case, make angles other than 0° and 180° with each other is also conceivable. The angles are predefined depending on the propagation direction of the light such that the absorption is maximized. The actual position of the absorption surfaces likewise depends on the orientation of the preferred direction in relation to the large faces and on the longitudinal extent of the light guide between coupling-in surface and end edge;

the maximization of the absorption is in this respect a design problem with a plurality of equivalent possible solutions.

The protective body advantageously has a thickness of between 50 µm and 1000 µm, as already stated above, and it is optically coupled to the sensor layer. The protective body can consist of different materials, for example glass, ceramic or plastic. The narrower the light cone around the preferred direction, i.e. the narrower the irradiated angular spectrum, the greater the thickness of the protective body that can be chosen, i.e. the greater the distance of the contact surface from the sensor layer can be. Since according to the invention a directed edge illumination by means of LEDs or lasers is used and the effect of disturbed total internal reflection is utilized, in contrast to the state of the art where an internal diffuse illumination is used, commercially available thin glass with a thickness of more than 50 µm can be used, which proves to be less complex in terms of the procurement and processability, i.e. the process stability during the optical bonding or during the coating. Furthermore, protective films or protective glasses which can be removed without leaving a residue, as are used in the display industry, can also be used as protective body, whereby renewal of the sensor protection is available through easier replaceability. Transparent ceramics can also be used. Due to the increased thickness of the protective body, the sensor layer is encapsulated extremely stably, mechanically and chemically. In addition, the entire module can be produced both with a low weight of less than 300 g and also thin with a thickness of less than 2.5 cm.

A diaphragm layer is advantageously arranged between the contact surface and the sensor layer to suppress the detection of ambient light, wherein a diaphragm is in each case arranged above a sensor element. This serves for protection against ambient light as according to some users' requirements the sensors must also function during irradiation in direct sunlight. The detectable angular spectrum is limited by the diaphragms to the relevant range which is defined by the light coupling-in conditions. A spectral filter layer can additionally or alternatively also be formed between the contact surface and the sensor layer, or the protective body itself can be formed as a spectral filter layer. The spectral filter layer can also be only part of the protective body. It is also possible to form the sensor elements themselves so as to be wavelength-selective only for light of the illumination wavelengths. All measures can also be combined with each other.

A restriction of the spectral range by integrating the spectral filter layer in the protective body can be achieved, for example, with absorbent organic or inorganic dyes, particles, plasmonic filters—resonant metal nanoparticles—or interference filters. If an adhesive is used to join the protective body to the sensor layer, the protection against ambient light can also be integrated therein; the spectral filter layer then corresponds to the adhesive layer. Protection against ambient light at a pixel level is possible through a structured spectral filter. Here, only the light which propagates from the area of skin to be captured through the contact surface to the light-sensitive area of the sensor element is spectrally filtered and allowed to pass through, but not the illumination light beams which propagate through the sensor component and the contact surface and illuminate the area of skin to be captured.

In a particularly preferred embodiment of the invention, an additional light source is arranged below the lower large face of the light guide, and is spaced apart from the lower large face of the light guide. A layer, the refractive index of which is lower than that of the light guide, is located between the light guide and the additional light source. The light guidance in the light guide is not meant to be prevented thereby; one possibility for achieving this is an air gap between light guide and additional light source. The additional light source emits light in planar form; it can be designed, for example, as background lighting, as used in the display industry, or also as a complete display. A display makes it possible to represent items of information on the contact surface; direct user guidance is made possible in this way. The additional light source emitting light in planar form is not directly connected to the lower large face of the light guide, i.e. is not optically coupled thereto; for example, a thin air layer is located between the two in order not to disturb the total internal reflection at the lower large face. It is also possible by means of the additional light source to capture documents, because the light from this light source is as a rule undirected and the principle of total internal reflection does not apply here. However, the illuminance of the additional light source is advantageously adapted to the degree of transmission of the homogenizer, with the result that the object to be captured is also illuminated as far as possible with the same illuminance all over during the capture of documents.

The additional light source can be formed such that it simultaneously or successively emits light—preferably via control—in several different wavelengths or in several different wavelength ranges—in particular not overlapping one another. This makes control images for authentication of security documents and banknotes possible. For this, it is advantageous that the light source can also emit light in the IR or in the UV range in addition to the wavelength ranges visible to the human eye. To capture documents in color, it is furthermore advantageous when the additional light source can emit light from the red, the blue and the green wavelength ranges one after the other. Light of these wavelength ranges can preferably be switched on and off individually by means of a controller, in particular if the sensor elements record only the intensity, but not the colors—a color image can then be evaluated by means of corresponding image processing algorithms.

The additional illumination can also consist of individual light sources which can then also be arranged between sensor layer and mirror layer; in this case an adaptation of the illuminance to the degree of transmission of the homogenizer can be dispensed with. However, an arrangement below the light guide is to be preferred as there is a greater flexibility with respect to the choice of additional light source here and the element which bears this additional light source need not be transparent. Moreover, no further layer need then be penetrated by the illumination light, which in every case is associated with losses. The light source which emits the illumination light for capturing the areas of skin can advantageously be switched off when the additional illumination is used.

An embodiment of the invention relates to a device for the contact-based simultaneous capture of prints of several areas of skin of human autopodia supplied with blood, by means of disturbed total internal reflection. Seen from the direction of an area of skin in contact, the device comprises a protective body of predefined thickness with a contact surface, wherein the contact surface has a size which makes possible the simultaneous placement of several autopodia. A sensor layer follows, which comprises light-sensitive sensor elements, arranged in the form of an array, for detecting light of at least one predefined wavelength range, wherein passband areas which are transparent for light of at least one predefined illumination wavelength range are arranged between the sensor elements. Finally, the device also comprises a light guide made of a material that is transparent for light of the predefined illumination wavelength range, wherein the light guide is designed in the form of a plane-parallel plate. The plane-parallel plate comprises a lower large face and an upper large face arranged parallel thereto which faces the sensor layer. The large faces are connected by several edges, wherein one of the edges is formed as a coupling-in surface for illumination light which is emitted from a light source along a longitudinal direction of the coupling-in surface.

According to the invention the light source emits light in a limited angular range around a preferred direction. The preferred direction makes an angle of incidence with the large faces, which is predefined such that light which is emitted in the angular range would, after entering the light guide, be totally internally reflected at the large faces in the case of a medium with a refractive index of air in contact therewith. Between the sensor layer and the light guide a mirror layer is arranged which reflects one portion of the illumination light back into the light guide and transmits another portion of the illumination light. The device comprises means for homogenizing the illuminance of illumination light which exits the light guide through the upper large face thereof and strikes the contact surface. The device additionally or alternatively also comprises means for homogenizing a light quantity to be detected depending on the illuminance of the illumination light from the protective body striking the contact surface, wherein the homogenization is effected depending on the distance to the light source.

It is understood that the features named above and those yet to be explained below can be used not only in the stated combinations but also in other combinations or alone, without departing from the scope of the present invention.

BRIEF DESCRIPTION OF THE DRAWINGS

In the following, the invention is explained in yet more detail by way of example with reference to the attached drawings, which also disclose features essential to the invention. There are shown in:

FIG. 1 the basic structure of a device for capturing fingerprints,

DETAILED DESCRIPTION

Figure 2A:
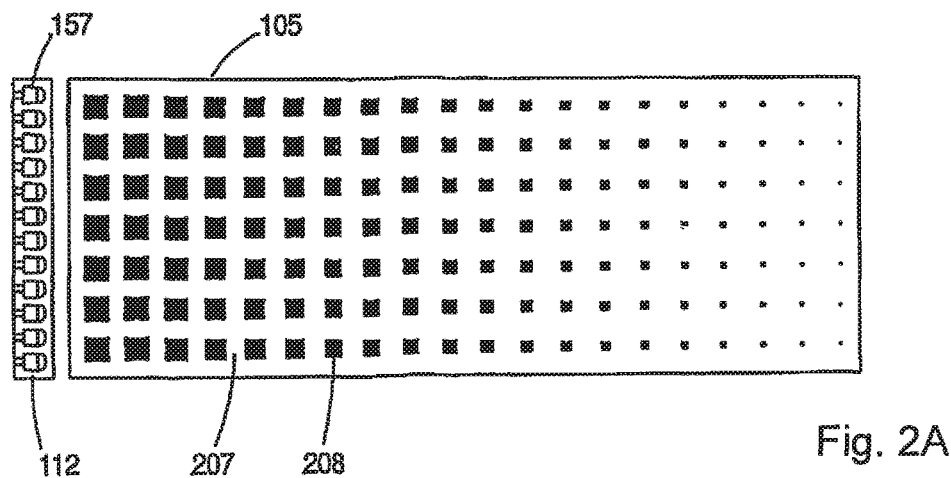
FIGS. 2A-F various embodiments of homogenization means integrated in a mirror layer, FIGS. 3A-E various embodiments of an end edge for the prevention of back reflections, FIG. 4 the beam path of illumination light for an angular range, FIG. 5 an embodiment of the device with a thick protective body, FIG. 6 an embodiment of the device with diaphragms above the sensor elements, FIGS. 7A, B the function of a sensor element with a restricted aperture and diaphragm, FIG. 8 an embodiment of the device with a spectral filter layer, FIGS. 9A-C various embodiments of the coupling-in of light, FIG. 10 a device for capturing areas of skin with an additional light source for capturing documents, FIG. 11 a device in top view with diaphragms of different sizes for the homogenization, and FIG. 12 an arrangement with an absorption layer of varying thickness for the homogenization.

FIG. 1 shows the basic structure of a device for the contact-based simultaneous capture of prints of several areas of skin of human autopodia supplied with blood, by means of disturbed total internal reflection. A section of the device is shown along the direction in which light is emitted. By way of example here, two fingers 101 as autopodia are placed on a capture surface 102, which forms the closure of a protective body 103 of predefined thickness. The contact surface 102 here has a size which makes possible the simultaneous placement of several autopodia. Seen from the fingers 101, below the protective body 103 a sensor layer 104 is arranged which comprises light-sensitive sensor elements 201, arranged in the form of an array, which are also referred to as pixels in the following. The sensor elements 201 are designed to detect light of at least one predefined wavelength range—which comprises at least one wavelength. Passband areas 202 which are transparent for light of at least one predefined illumination wavelength range are arranged between the light-sensitive sensor elements 201. Seen from the fingers 101, further below the sensor layer 104 a light guide 106 made of a material that is transparent for light of the predefined illumination wavelength range is arranged.

The light guide 106 is designed in the form of a plane-parallel plate and comprises a lower large face 155 and an upper large face 156 which is arranged parallel to the lower large face 155 and faces the sensor layer 104. The two large faces 155, 156 are joined to each other by several edges which are not represented in FIG. 1, which shows a section of a device. One of the edges is formed as a coupling-in surface for illumination light. A light source 112 which emits the illumination light is arranged along a longitudinal direction of the coupling-in surface, i.e. perpendicular to the sheet plane here.

The light source 112 emits light in a limited angular range around a preferred direction 113, which preferred direction 113 makes an angle of incidence with the two large faces 155, 156, which is predefined such that light which is emitted in the angular range would, after entering the light guide 106, be totally internally reflected at the two large faces 155, 156 in the case of a medium with a refractive index of air in contact therewith. In fact air is in contact with the lower large face 155 as medium, with the result that the condition for total internal reflection is fulfilled there. However, a mirror layer 105 arranged between the sensor layer 104 and the light guide 106 which reflects one portion of the illumination light back into the light guide 106 and transmits another portion of the illumination light is located on the upper large face 156. Protective body 103, sensor layer 104, mirror layer 105 and light guide 106 are optically coupled to each other, i.e. for example bonded to each other by optical bonding, in each case according to their layer sequence. The adhesive and the materials of the layers are chosen such that they have refractive indices that are as similar as possible in order to minimize the extent to which the spectrum of angles of incidence fans out around the preferred direction 113.

The light emitted by the light source 112 is coupled into the light guide 106 along the preferred direction 113. A total internal reflection of the light takes place at the lower large face 155 of the light guide 106. With every reflection only a fraction of the light is transmitted as a transmitted beam 107 by the mirror layer 105 lying between the light guide 106 and the sensor layer 104 and is guided through the passband areas 202 in the sensor layer 104 and through the protective body 103 to the contact surface 102.

In this way it is ensured that the light guided in the light guide 106 is reduced only slightly over many reflections. Without a mirror layer 105, a large proportion of the light would be absorbed in the sensor layer 104 depending on the degree of transmission of the sensor layer 104, which would lead to a very uneven illumination, which is furthermore still dependent on the position of the fingers 101 placed on. Without a reflective layer, the illumination intensity would moreover fall off to a even greater extent as the distance to the light source 112 increases, this fall-off being minimized by the mirror layer 105.

If an object, such as the fingers 101 shown here by way of example, lying on the contact surface 102 is not in contact with the latter at the point of reflection of the transmitted beam 107, a total internal reflection takes place. A beam 108 reflected at the contact surface 102 strikes the sensor element 201 and is recorded on the basis of its light sensitivity. The corresponding sensor element 201 lies opposite the point of reflection on the contact surface 102 moved away from the light source by $\Delta z = d \cdot \tan(\alpha)$, wherein d denotes the thickness of the protective body 103 and $\alpha$ denotes the angle of the reflected beam 108 to the surface normal of the contact surface 102.

Areas of skin, in particular fingers, are not smooth surfaces. For example, fingers have papillary valleys and papillary ridges, such that the known, individual structures form. In the case of the fingers 101 shown here, the papillary valleys 110 are not in contact with the contact surface 102; the beam is totally internally reflected and recorded here. However, the fingers 101 lie on the contact surface 102 with the papillary ridges 111, and at this point the fingers 101 are in contact with the contact surface 102. The transmitted beam 107 penetrates the finger 101 there. The light is scattered within the finger at naturally present scattering centres 109, the predominant portion of the light remains in the finger, and only a fraction is coupled into the protective body 103 again via the contact surface 102 and has the possibility of striking the light-sensitive sensor element 201. Papillary ridges therefore become noticeable in the image due to a lower intensity; their image is darker than that of the papillary valleys 110. Overall, in this way a light-dark pattern is formed via all the sensor elements 201 of the sensor layer 104, which corresponds to the prints of the fingers 101 placed on. The protective body 103 serves as an optical medium in order to guide the transmitted beams 107 that have passed through the passband areas 202 with illumination light onto the light-sensitive sensor elements 201, where the light is converted to an electrical signal corresponding to the intensity. Furthermore, the protective body 103 is also used to protect the sensor layer 104 against damage or destruction by objects placed thereon.

A beam which enters the light guide 106 along the preferred direction 113 is split into a transmitted beam 107 and a reflected beam 114 when it strikes the upper large face 156; only a fraction of the light is guided further as a transmitted beam 107 due to the mirror layer 105. The reflected beam 114 is once again reflected at the lower large face 155 and again strikes the upper large face 156 as a reflected beam 115, where once again a fraction is coupled out as a transmitted beam and guided by the mirror layer 105 to the contact surface 102, while a predominant proportion of the beam 115 is once again reflected and is directed to the lower large face 155 as a reflected beam 116. With every reflection at the upper large face 156, a small portion of the intensity is coupled out and transmitted, with the result that the intensity of the beam propagating in the light guide 106 is increasingly reduced.

When a mirror layer 105 is used, although the illumination intensity drops to a lesser extent than without such a mirror layer 105 as the distance from the light source 112 increases, the degree of reflection of the mirror layer 105 must be chosen to be as high as possible in order to keep the illumination fall-off as low as possible. The system thereby becomes less efficient as a large portion of the light is guided unutilized through the light guide 106 and is coupled out or absorbed at the end. To correct the illumination fall-off in order to obtain a bright image which is illuminated as evenly as possible, the device therefore comprises a homogenizer or means for homogenizing the illuminance of illumination light which exits the light guide 106 through the upper large face 156 thereof and strikes the contact surface 102. The device additionally or alternatively comprises means for homogenizing a light quantity to be detected depending on the illuminance of the illumination light from the protective body 103 striking the contact surface 102. The homogenization corresponds to the fall-off in the illuminance as the distance from the light source 112 increases, and is therefore effected depending on the distance from the light source 112, wherein a non-linear progression of the fall-off in the illuminance is optionally taken into consideration. The means for homogenizing the illuminance or the light quantity to be detected can be realized in various ways, some of which are explained by way of example in the following.

A first possibility consists of forming the homogenizer for homogenizing the illuminance on the mirror layer 105; the mirror layer 105 is optically coupled to the sensor layer 104 and the light guide 106, as has already been explained previously. A formation of the homogenizer on the mirror layer 105 comprises an embodiment of the mirror layer 105 described above to the effect that the degree of reflection of the mirror layer 105 decreases as the distance from the light source 112 increases and the degree of transmission increases. Examples of such mirror layers which have a decreasing degree of reflection and an increasing degree of transmission as the distance to the light source 112 increases are represented in FIGS. 2A-2F. In the embodiment examples represented in FIGS. 2A-2D and 2F this is achieved via a change in the area proportion of reflecting areas 208 and transmitting areas 207, wherein a representative area proportion for which the degree of reflection is determined has to comprise a section which is significantly larger than the extent of the individual reflecting areas 208 or transmitting areas 207 respectively, with the result that the proportion of the reflecting areas 208 per unit area decreases on average with the distance from the light source 112 and the proportion of the transmitting areas 207 per unit area increases on average with the distance from the light source 112.

Figure 2B:
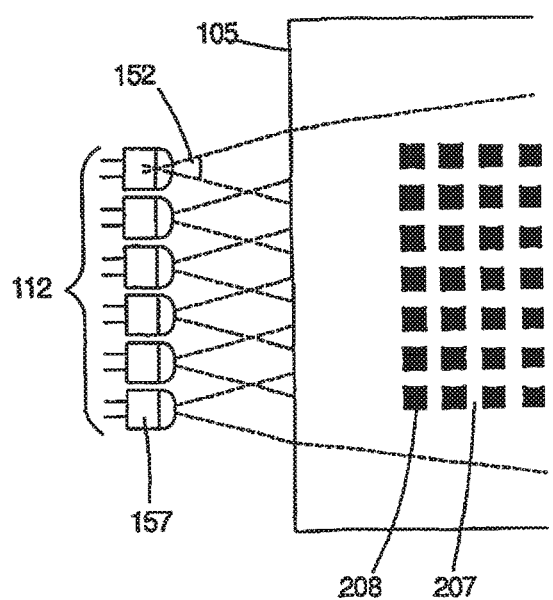

In FIG. 2A, which shows the mirror layer 105 in a top view from above—the contact surface then lies parallel to the sheet plane, as in FIGS. 2B, C, D, F, wherein the sensor layer 104 and the protective body 103 have been omitted for better understanding—the reflecting areas 208 are by way of example designed rectangular, more precisely square, their number per unit area, i.e. per representative area of surface, is constant, whereas the surface area—i.e. the size—of the reflecting areas 208 is reduced as the distance from the light source 112 increases, which light source is designed so as to emit light linearly, and can be formed, for example, from a plurality of LEDs 157 arranged next to each other, with the result that the proportion of the transmitting areas 207 is increased. The reflecting areas 208 can in principle have any desired geometric shape; they can be designed as polygons, stars, circles, ellipses or rings or can also have irregular shapes. The proportion of the reflecting areas 208 can—on average over a representative surface area—decrease linearly or be adapted to a calculated or measured non-linear fall-off in the illumination intensity or illuminance for an even better compensation for the illumination fall-off. In addition to the size of the reflecting areas 208 or of the transmitting areas 207, the number thereof or the distance thereof from each other along the distance from the light source 112 can also be varied, and this variation can likewise take place in simplified terms linearly or adapted to the actual illumination conditions. The reflecting areas 208 arranged in a chequered pattern in FIGS. 2A and 2B can, in the case of an arrangement in rows parallel to the linear illumination 112, also lie offset relative to the reflecting areas of the previous or subsequent row in successive rows. The variation in the distances, size or number of the areas can also be combined with each other in order to achieve an optimal result.

FIG. 2B shows a detail of the structure from FIG. 2A. The light source 112 here is formed by individual LEDs which are lined up next to each other along the coupling-in surface parallel to one dimension of the planar extent of the sensor layer 104 in order to form a line light source, the length of which preferably corresponds at least to the corresponding dimension of the sensor layer 104. The individual LEDs 157 are arranged in such a way that the light bundles emitted by them at an aperture angle 152 in a plane parallel to the contact surface 102 overlap each other such that, when the beams are reflected onto the light-sensitive sensor elements 201 a mixing of the bundles and thus a homogenization of the illumination of the contact surface 102 is always ensured in the longitudinal direction, i.e. along the line formed by the light source 112. The LEDs 157—lasers can also be used as individual light sources here—can advantageously be actuated individually via a controller, and in this way non-uniformity of the illumination can be further reduced. The controller can be linked to an evaluation of the image contents, with the result that an active control of the individual LEDs 157 during the image capture is used to improve the contrasts in the image and for better modulation of the sensor elements 201.

Figure 2C:
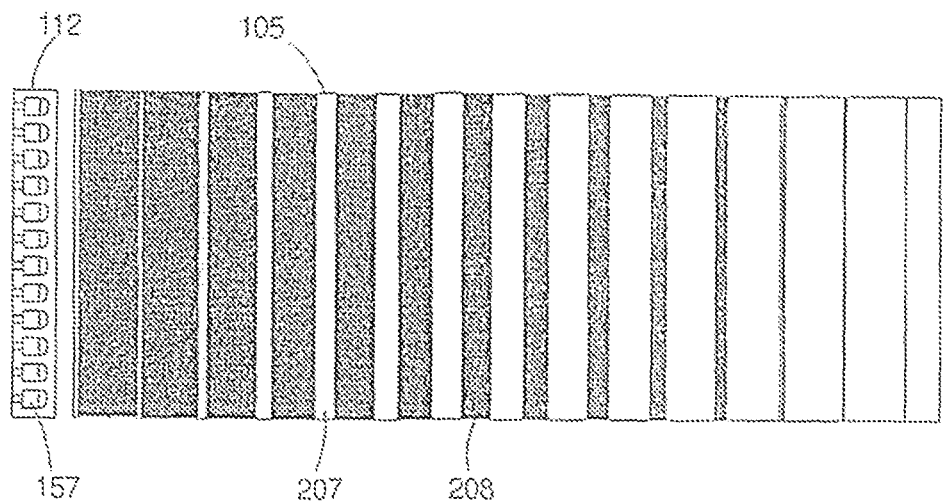

FIG. 2C shows a further embodiment of a mirror layer on which homogenization means, i.e., a homogenizer, are formed in strips. The transmitting areas 207 are represented as white strips, the reflecting areas 208 as black strips. The transmitting areas 207 and the reflecting areas 208 in each case extend longitudinally over the whole extent of the light source 112, i.e. substantially transverse to the light propagation direction. The change in the transmission here is also achieved by a change in the size of the areas; in the view chosen for the representation the width of the black reflecting areas 208 and of the white transmitting areas 207, i.e. the extent along the light propagation, is varied. The homogenization of the illuminance can also be effected via a linear or adapted reduction in the distances between the reflecting areas 208 along the illumination direction with a then constant size of the reflecting areas 208, or alternatively also by a combination of changes in size and distance.

Figure 2D:
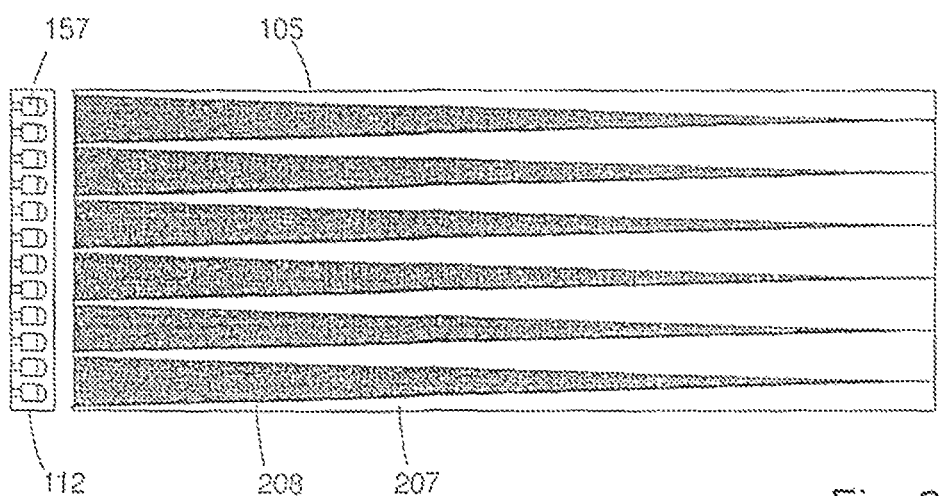

FIG. 2D shows a further embodiment of a mirror layer 105 with an increasing degree of transmission as the distance from the light source 112 increases, i.e. longitudinally to the illumination direction. The change in the degree of transmission here is achieved by an enlargement of the transmitting areas 207 and a corresponding decrease in size of the reflecting areas 208 transverse to the illumination direction, i.e. parallel to the line light source, as the distance to the light source 112 increases; the extent of the reflecting areas 208 in the longitudinal direction of the light source 112 decreases as the distance from the light source 112 increases. The decrease in the size of the reflecting areas 208 along the illumination direction here is effected linearly, as can be seen in the straight lines; the separating lines between transmitting areas 207 and reflecting areas 208 are straight lines, which is simpler for production. Here too, it is possible to adapt to the actual illumination conditions; the correction can be improved if the lines have a curve shape adapted to the actual progression of the fall-off in the illuminance, for example.

Figure 2E:
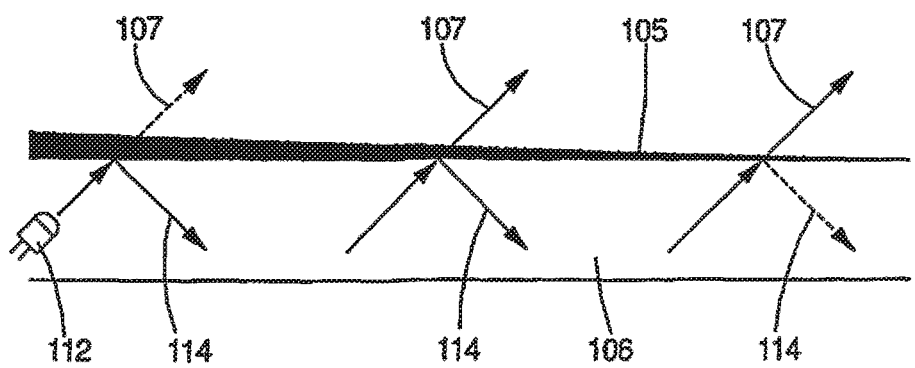
Figure 2F:
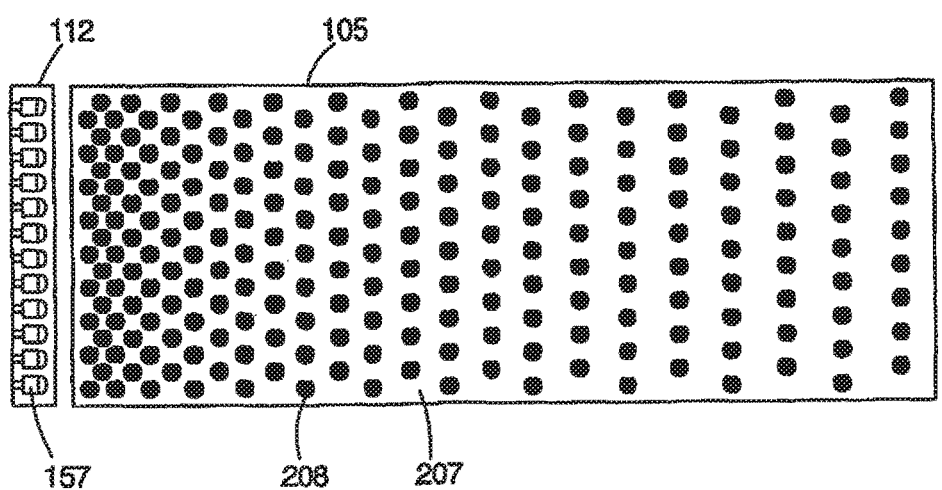

FIG. 2F shows a further embodiment of a mirror layer 105 in which the transmission increases as the distance from the light source 112 increases. Purely by way of example, the reflecting areas 208 here have a circular shape that is easy to produce and are all the same size. The circular reflecting areas 208 here are arranged such that their distance from each other in the illumination direction increases as the distance from the light source 112 increases. Along the longitudinal direction, i.e. parallel to the light source, the circular reflecting areas 208 are in each case arranged in rows offset relative to each other, with the result that a particularly dense arrangement is possible in the region of the light source 112. In this way, when sensor plane 104 and protective body 103 have a constant thickness, larger reflecting areas 208 and/or larger transmitting areas 207 can be used without the projected structure thereof having a quality-reducing effect on the image of an object placed on, forming in the plane with the sensor elements 201. Parallel to the light source 112 formed by the LEDs 157 and emitting light linearly, the reflecting areas 208 in this example are in each case spaced apart equally, however this is not compulsory.

FIG. 2E shows a further embodiment with means for the homogenization integrated in the mirror layer; the section represented lies perpendicular to the contact surface 102. Here the thickness of the mirror layer 105 decreases as the distance from the light source 112 increases; in this way the degree of transmission of the mirror layer 105 is increased and the degree of reflection is consequently lowered. Here too, the thickness can decrease linearly with the distance or can be adapted specifically to a calculated or measured fall-off in the illuminance. If the mirror layer 105 is formed wedge-shaped, it can be optically bonded to a compensation layer made of a transparent material which preferably has a similar refractive index to the other materials in order to minimize the splitting of the angular spectrum; the outer surfaces of this double-wedge structure then lie parallel to each other with the result that all the further boundary surfaces of the layer composite including the contact surface lie parallel to each other.

Whereas in the previous examples the transparent areas were represented as light and the reflecting areas as dark, the mirror structures can also be prepared inversely, i.e. the dark areas which were previously described as reflecting are then transparent and vice versa. In these cases, the illumination is effected from the opposite side in order that the degree of transmission of the mirror layer 105 becomes greater as the distance from the light source increases and the degree of reflection smaller, i.e. the light source 112 and the coupling-in surface would then be arranged on the right-hand side of the mirror layers 105 shown in the case of the mirror layers 105 formed in the inverse manner to those in FIGS. 2A-D and 2F.

As an alternative or in addition to the examples described previously, the density of a material which essentially brings about the reflection at the mirror layer 105, i.e. of a component of the mirror layer 105, can also decrease as the distance from the light source increases.

Figure 12:
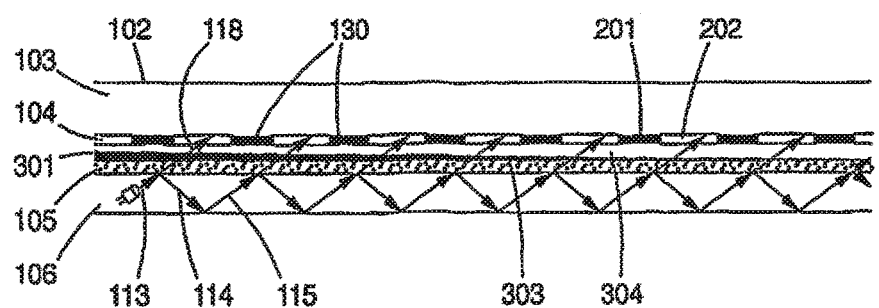

In the preferred embodiment represented in FIG. 12, the homogenization means is realized by means of a separate layer for this purpose instead of on the mirror layer 105, for example by an absorber 301 with an absorption layer 303 which is arranged between the mirror layer 105 and the sensor layer 104, wherein as the distance from the light source 112 increases the degree of absorption of the absorption layer 303 for the illumination light decreases and the degree of transmission increases. This is represented by way of example in FIG. 12 with an absorption layer 303 formed wedge-shaped; to maintain the parallel position of the boundary surfaces the absorption layer 303 is optically coupled to a transparent compensation layer 304, and both together form the absorber 301.

Figure 11:
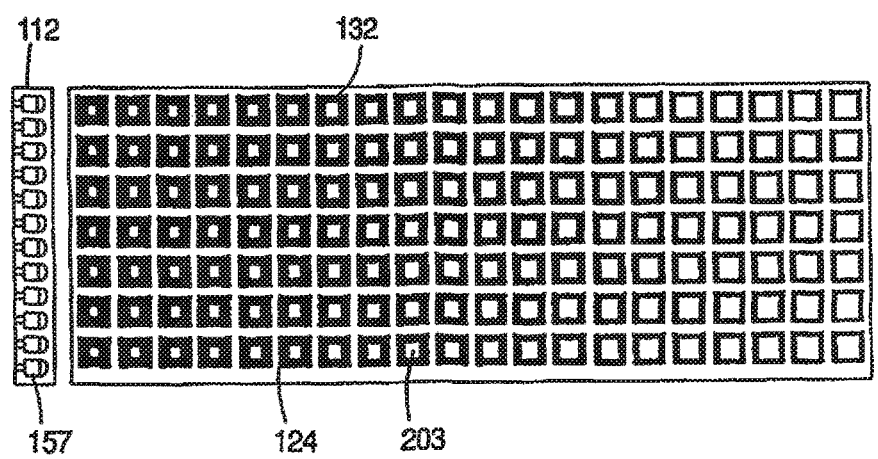

FIG. 11 finally shows an embodiment in which the device comprises a homogenizer for homogenizing the light quantity to be detected, i.e., a homogenizer for homogenizing the light quantity to be detected, these means comprise a pixel aperture diaphragm layer 124, which can be arranged above the sensor layer 104, with individual pixel aperture diaphragms 132 which are represented greatly enlarged in FIG. 11. The diaphragm apertures 203 of the pixel aperture diaphragms 132 increase as the distance from the light source 112 increases, i.e. the greater the distance from the light source 112, the more light that can be detected. The homogenizer for homogenizing the light quantity to be detected can additionally or alternatively also comprise a means to control sensitivity of the sensor elements, such as a controller for varying the light sensitivity of the sensor elements 201; in this case the diaphragm apertures 203 can also all be identical.

A suppressor, or means, for suppressing the formation of returning beams are preferably formed on an edge of the light guide 106 formed as end edge 300, which lies opposite the coupling-in surface in the light propagation direction. FIGS. 3A-3E show various embodiments of these suppressing means. In these figures, the side of the structure with the end edge 300 facing away from the light source is shown in each case. The proportion of the light propagated by the light guide 106 strikes the end edge 300 of the light guide 106 at the end, as a light beam 160. Without further measures, the light—represented by way of example here in the form of the light beam 160—is reflected and propagated back again by the light guide 106, at an angle which is dependent on the inclination of the end edge 300 in relation to the upper large face 156. The light beam 161 reflected back is totally internally reflected at the lower large face 155 when the end edge 300 makes a right angle with the upper large face 156 and continues as a once again reflected light beam 162. Because the mirror layer 105 allows a fraction of the light to pass through, a fraction of the returning light beam 163 also passes through the mirror layer 105, the sensor layer 104 and the protective body 103 and strikes the contact surface 102. If there is no object lying thereon—reference is made here to the description relating to FIG. 1—it is totally internally reflected at the contact surface 102 and strikes a light-sensitive sensor element 201 as a light beam 164; otherwise, it enters the object lying thereon and is scattered there. The beam path of the returning light beam is indicated by dashed lines and that of the entering light beam by continuous lines; they correspond to the light beams described in conjunction with FIG. 1. Images of the object texture are projected onto the sensor layer 104 with the individual sensor elements 201 both by the entering beams and by the returning beams, which are here shifted relative to each other by the distance of two pixels. With the prerequisite shown in FIG. 3A that the end edge 300 is arranged perpendicular to the upper large face 156, two images are generated, wherein the image of the returning beam is shifted by $\Delta z = -d \cdot \tan(\alpha)$ in the direction of the light source 112. d is again the thickness of the protective layer and a is the angle of the reflected beam to the surface normal of the contact surface 102. Without further measures, a double image is thus generated by the advancing and returning beam, and the two individual images are shifted by the value of $2\Delta z$.

Figure 3A:
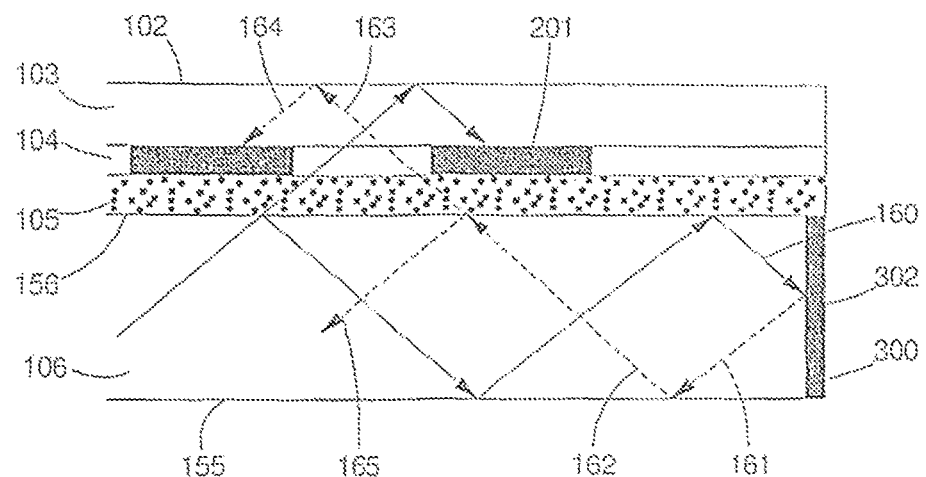
Figure 3B:
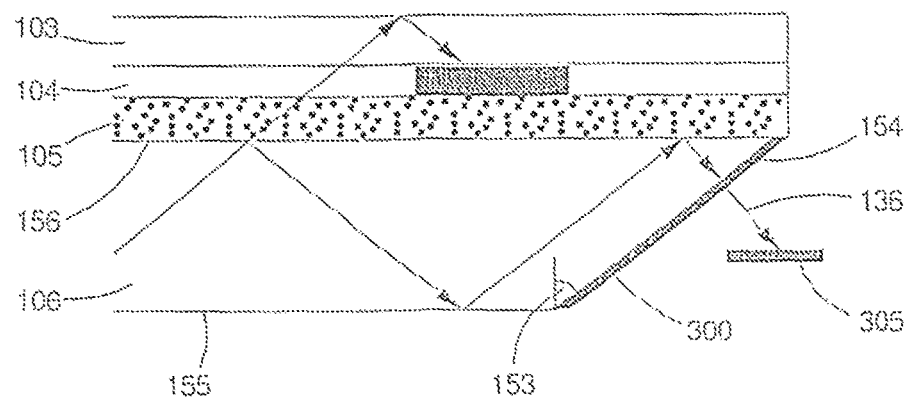

The returning beams are suppressed by the measures described in the following. A simple measure is to provide the end edge 300 with an absorption layer 302, represented in FIG. 3A by the thick black bar. This prevents a reflection at the end edge 300 and furthermore prevents radiation from being able to propagate back. A further embodiment of the suppressing means is represented in FIG. 3B. Here the end edge 300 is inclined such that the striking beams preferably strike at right angles, i.e. the end edge 300 is essentially arranged perpendicular to the propagation direction of light that has entered the light guide 106 along the preferred direction 113, in order to achieve the lowest possible reflection. In addition, the end edge 300 here is provided with an antireflection coating 154 in order to minimize the reflection. Transmitted light beams 136 are collected by an additional absorber 305.

Figure 3C:
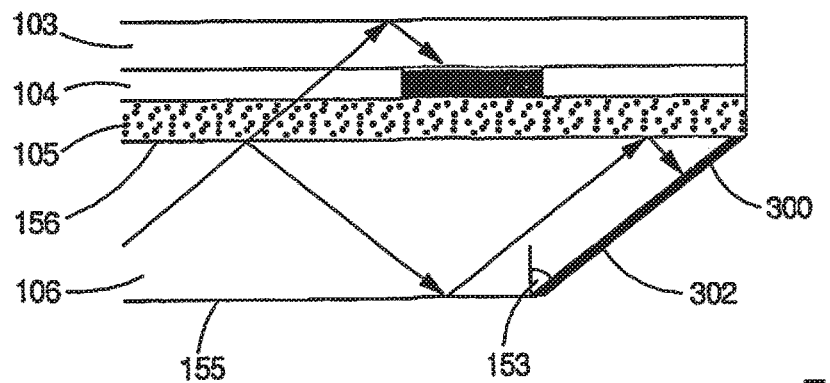

FIG. 3C shows a variation of FIG. 3B; here the end edge 300 is also inclined in relation to the lower large face 155 by an angle of inclination 153 in addition to the right angle, the end edge 300 here is itself provided with an absorption layer 302. The absorption layer 302 can be realized, for example, by blackening the surfaces, by roughening or by a combination of the two or by further measures known in the state of the art.

Figure 3D:
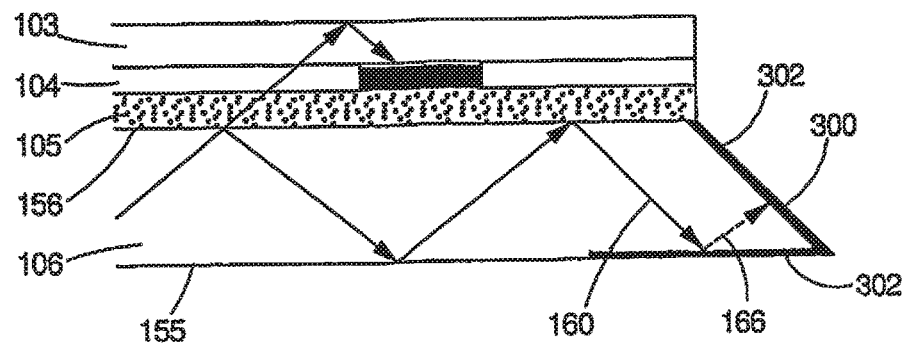
Figure 3E:
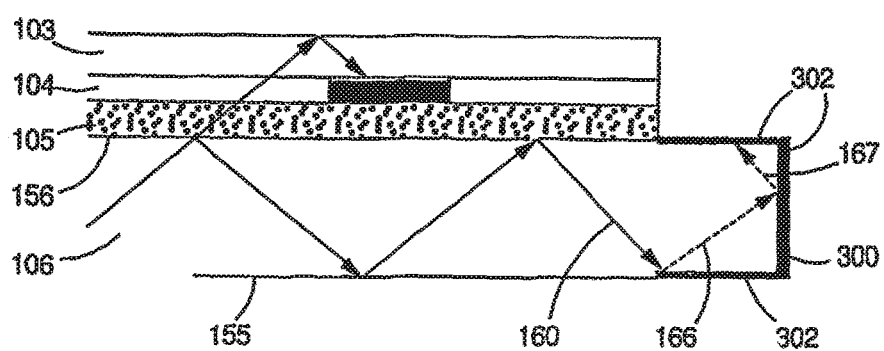

Further embodiments are shown in FIGS. 3D and 3E; here the end edge 300 is composed of two or three individual surfaces which, in pairs in each case, make angles other than 0° and 180° with each other, wherein the angles are predefined depending on the propagation direction of the light in such a way that the absorption is maximized. In the region of the end edge 300, the lower large face 155 is extended compared with the upper large face 156 and, with the end edge 300, makes a corresponding angle which is chosen such that reflected light strikes the end edge 300 there as close to perpendicular as possible. The region of the end edge 300 here consists of several absorption surfaces which meet each other at different angles. In FIG. 3D, the end region of the lower large face 155 is likewise provided with an absorption layer 302; unabsorbed light strikes the end edge 300 as close to perpendicular as possible and is absorbed there by a further absorption layer 302; the degree of absorption can be increased in this way. FIG. 3E finally shows a variant in which the light guide 106 extends beyond the area of the sensor layer 104, the mirror layer 105 and the protective body 103 in the direction of the light emitted by the light source 112 and the end regions of the lower large face 155 and of the upper large face 156 as well as the end edge 300 are in each case provided with an absorption layer 302. The proportions of the light beams 166 not absorbed by the first absorption layer 302 on the lower large face 155 are directed to the end edge 300 and the proportions of the light beams 167 not absorbed there are directed to the absorption layer 302 formed on the upper large face 156. In this way it is possible by simple technical means to achieve a threefold absorption with the result that a high degree of absorption can be realized. In the representation chosen in FIG. 3E, the light guide 106 does not end flush with the other three layers of the protective body 103, the sensor layer 104 and the mirror layer 105, but a flush ending is readily possible if, for example, the end section of the upper large face 156 is provided with an absorption layer, for example by corresponding roughening, before the light guide 106 is optically coupled to the mirror layer 105.

Figure 4:
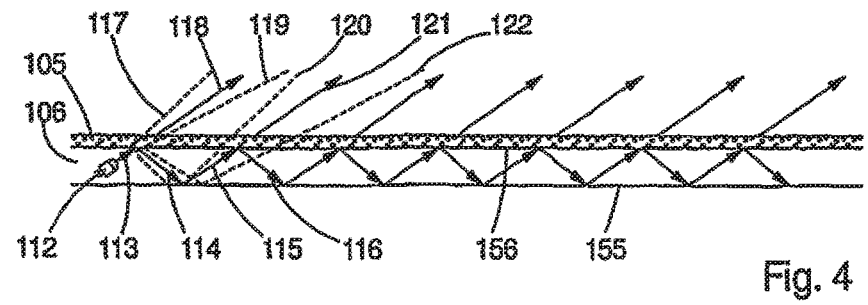

The beam propagation in the light guide 106 is now explained in more detail with reference to FIG. 4. Light is emitted by the light source 112 along the preferred direction 113 into the light guide 106, wherein for technical reasons light is also emitted in an angular range around the preferred direction 113; here the marginal beams 117 and 119 thereof are represented by the dashed lines for the range of angles of incidence directly after exiting the light source 112. A portion of the light emitted along the preferred direction 113 is transmitted by the mirror layer 105 and continues there as a central beam 118; the same applies to the marginal beams 117 and 119. The greater portion of the light is, however, reflected and continues as a reflected beam 114. After a reflection at the lower large face 155, it continues as a reflected beam 115, a smaller proportion passes through the mirror layer 105 as a central beam 121, while the greater proportion remains in the light guide as a reflected beam 116. Similarly the marginal beams are also reflected, wherein, however, the diameter of the aperture angle range, which for example can have a cone shape, becomes ever larger corresponding to the length of the light path, as can be seen, for example, in the marginal beams 120 and 122. Depending on the thickness of the light guide, the angle of incidence used and the size of the angular range, this leads to an overlapping of the proportional light bundles transmitted by the mirror layer 105 as the distance from the light source 112 becomes greater; in this way a homogeneous illumination of the contact surface 102 is achieved, independently of a homogenization of the illuminance. For the homogeneous illumination of the area of the contact surface 102 provided for the image capture, a course of the light through the light guide 106 before the first light-sensitive sensor elements 201 should therefore be provided, which is adapted depending on the thickness of the light guide, the angle of incidence and the angular range of the light emitted by the light source 112 such that, so far as possible, the illumination is already homogeneous in the area of this first sensor element 201. The angular range of the light bundle emitted by the light source 112, together with the thickness and the refractive index of the protective body 103, determines the resolution capacity of the system and is preferably less than $\pm 10°$ around the preferred direction 113 in the sheet plane shown in FIG. 4, i.e. in a plane perpendicular to the contact surface 102. Conversely, in the plane parallel to the contact surface a fanning out of the light beam as widely as possible is advantageous.

Figure 5:
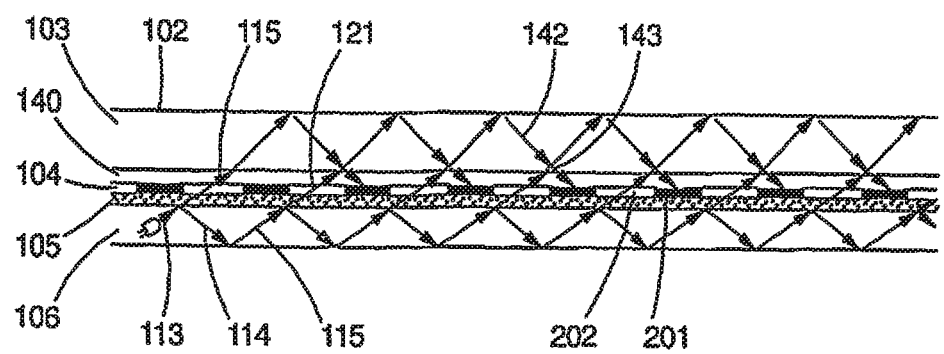

The protective body 103 can be applied to the sensor layer 104, for example by means of deposition processes. In comparison with known arrangements, however, thicker protective bodies 103 can be used, which can also be optically coupled to the sensor layer 104, by so-called optical bonding, by means of an adhesive agent adapted with respect to the transparency for illumination light and the refractive index. Such an example is shown in FIG. 5 where, between sensor layer 104 and protective body 103, an adhesive agent layer 140 is located which, for clarification, is represented here with a greater thickness than in reality. Through the use of an adhesive agent layer 140, further technological possibilities for applying protective bodies with greater thicknesses and a greater hardness than can be produced in deposition processes, preferably with thicknesses of between 50 μm and 1000 μm, result. The protective body 103 is then preferably made of hard thin glass, tempered glass or ceramic. Of course the protective body must be transparent for illumination light, but it is also possible to form the protective body itself as a spectral filter with the result that it blocks ambient light, for example. The protective body 103 can be produced separately and processed before application to the sensor in order to adapt it even better to the intended use. For example, the protective body 103 can be hardened or provided with electrically or optically active coatings; aesthetic treatments are also conceivable. The adhesive agent used for the adhesive agent layer 140 is at least partially transparent and can have a spectrally restrictive action by itself or by the introduction of optically active additives. In order to prevent reflections at the contact surface, the refractive index of the adhesive agent is adapted to that of the protective body 103. The light that can be recorded by the sensor elements 201 is limited in its wavelength spectrum by the last-named measure of spectral filtering, the sensitivity of the sensor element 201 with respect to ambient and interfering light can be reduced in this way, and the image quality is thereby increased, in particular if an overloading of some or all sensor elements can thereby be avoided.

FIG. 5 furthermore shows the beam path of the central beam taking into consideration small changes in refractive index at the boundary surface between the adhesive agent layer 140 and the protective body 103. The central beam 121 strikes the underside of the contact surface 102 and, provided no areas of skin are arranged above, is then once again totally internally reflected and enters the adhesive agent layer 140 as light beam 142 and then strikes the sensor element 201 as light beam 143.

Figure 6:
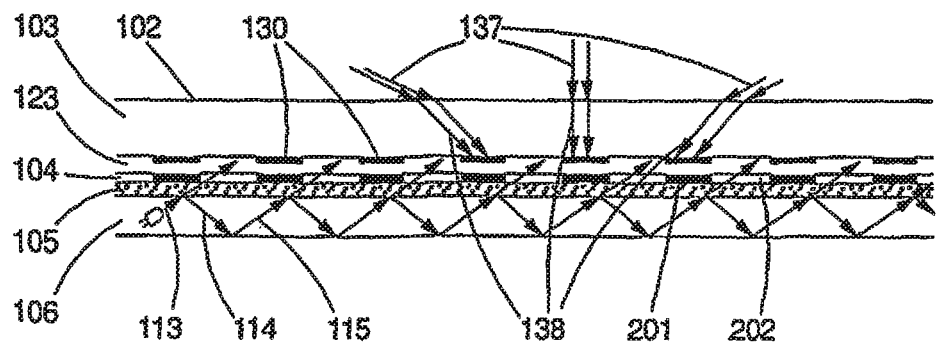

FIG. 6 shows a further embodiment of the device, wherein the separate adhesive agent layer 140 has not been represented. An additional ambient light diaphragm layer 123 is arranged here between the sensor layer 104 and the protective body 103 to suppress the detection of ambient light, wherein an ambient light diaphragm 130 is in each case arranged above a sensor element 201. In the areas outside the ambient light diaphragms 130, the ambient light diaphragm layer 123 is designed transparent. Light beams of ambient light 137 are refracted at the capture surface 102 and propagate as refracted light beams 138 in the direction of the sensor elements 201. The ambient light diaphragms 130 can be designed as simple, completely filled absorbing areas; in this way the light beams 138 of the refracted ambient light are prevented from striking the light-sensitive sensor elements 201 and the occurrence of image interference is thus prevented. However, the diaphragms can also simultaneously assume the function of homogenization, as described in conjunction with FIG. 11, and can comprise transparent areas of different sizes depending on the distance to the light source 112.

Figure 7A:
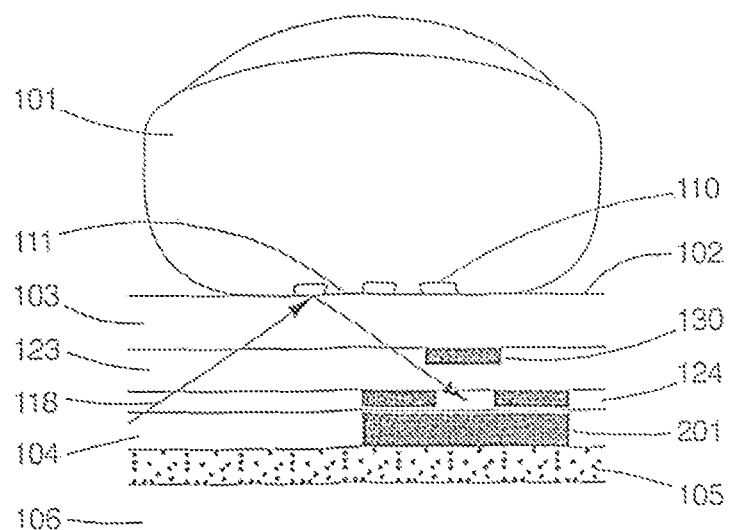
Figure 7B:
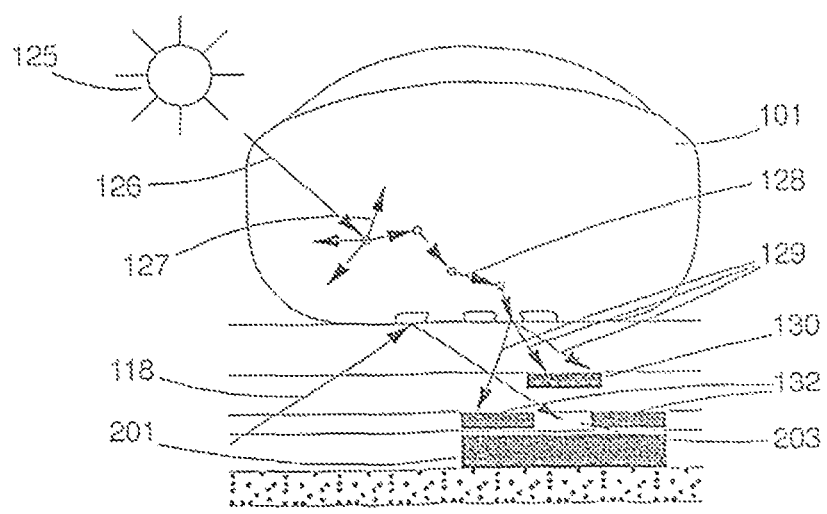

Even better, both aspects, the absorption of ambient light and the homogenization of the light quantity to be detected, can be realized when the diaphragm layer 124 with pixel aperture diaphragms described in conjunction with FIG. 11 and above this the separate ambient light diaphragm layer 123 with ambient light diaphragms 130 are arranged in order to block ambient light in the layer system. This is represented in FIGS. 7A and 7B. FIG. 7A shows such a structure with a finger 101 placed thereon and diaphragm layers 123 and 124 with pixel aperture diaphragms 132 for homogenizing the light quantity to be detected in the diaphragm layer 124 and ambient light diaphragms 130 in the ambient light diaphragm layer 123 for selective angle limitation in interaction with the diaphragm layer 124 arranged below it, which controls the aperture of the sensor elements 201. In the case of the homogenization of the light quantity to be detected, there is only one option and this can also be achieved by a corresponding embodiment of the mirror layer 105, as described previously, i.e. it is also possible for all the pixel aperture diaphragms 132 to have the same aperture with the result that the conditions for blocking ambient light are identical for all the sensor elements 201.

FIG. 7A shows the beam path in the case of a finger 101 placed on, wherein the central beam 118 strikes the contact surface 102 in an area above which a papillary valley 110 of the finger 101 is located, with the result that the central beam 118 is totally internally reflected and strikes the light-sensitive sensor element 201 both through the ambient light diaphragm 130 and through the pixel aperture diaphragm 132 through the diaphragm aperture 203. The situation for ambient light is additionally represented in FIG. 7B. By way of example, light from an external light source 125 enters the finger 101 as light beam 126 and is scattered there in scattered beams 127 and 128. After multiple scattering, a portion of the light enters the protective body 103 as light beam 129 via a papillary ridge 111 and the capture surface 102, wherein the irradiation direction is stochastic. This therefore results in several possible directions which the ambient light can take as light beam 129. Because the light beams 129 of the interfering radiation are predominantly at angles which cannot propagate through the gap between the absorbing area of the ambient light diaphragm 130 and the pixel aperture diaphragm 132, the image capture cannot be disrupted by the interfering radiation, and the contrast is not reduced.

Figure 8:
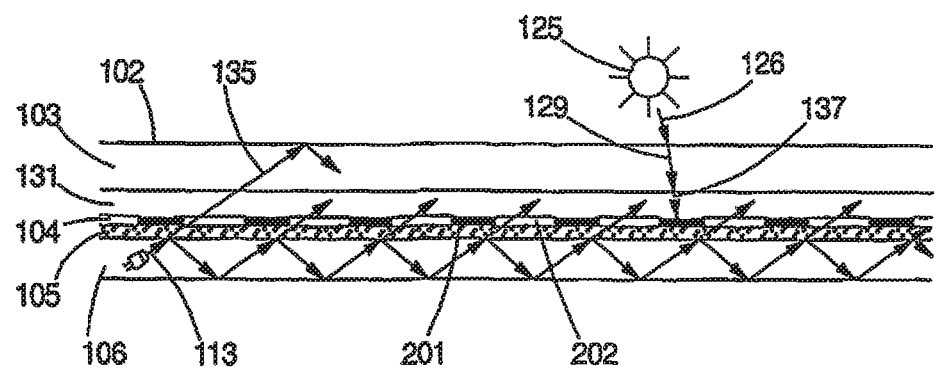

FIG. 8 shows a further embodiment of the device with a spectral filter layer 131 between the sensor layer 104 and the protective body 103; this embodiment can of course be combined with the other embodiments, as all the other embodiments can also be combined with one another. The purpose of the spectral filter layer 131 is to limit the spectral bandwidth of the light reaching the light-sensitive sensor elements 201. The spectral filter layer 131 can be formed as a smooth surface or structured such that a minimum of one filter is formed above the light-sensitive sensor elements 201 of the sensor layer 104, i.e. its spectral selectivity can vary over the surface, which is advantageous in particular for the case when light from an additional light source is used, as described below in conjunction with FIG. 10. The spectral filter layer 131 can for example be applied to the sensor layer 104 before application of the protective body 103, or alternatively applied to the protective body 103. The spectral filter layer 131 is preferably transparent only for those wavelengths or wavelength ranges which cannot penetrate the object placed on. The narrower the transmission band of the spectral filter layer 131, the better the shielding of the structure against interfering light. It is of course also possible to combine several spectral filter layers or to design the spectral filter layer such that it is selective for several wavelength ranges.

Figure 9A:
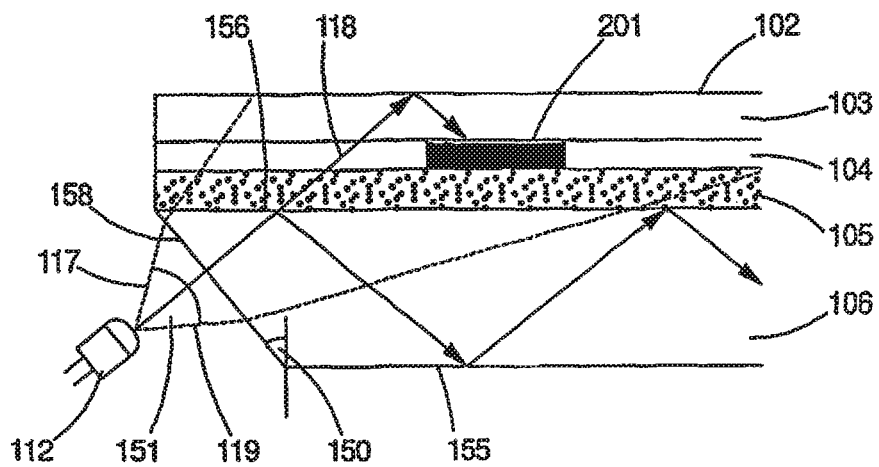
Figure 9B:
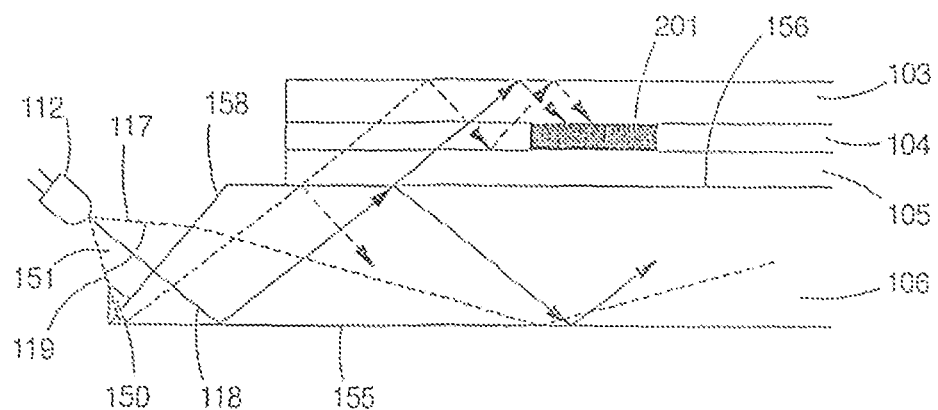
Figure 9C:
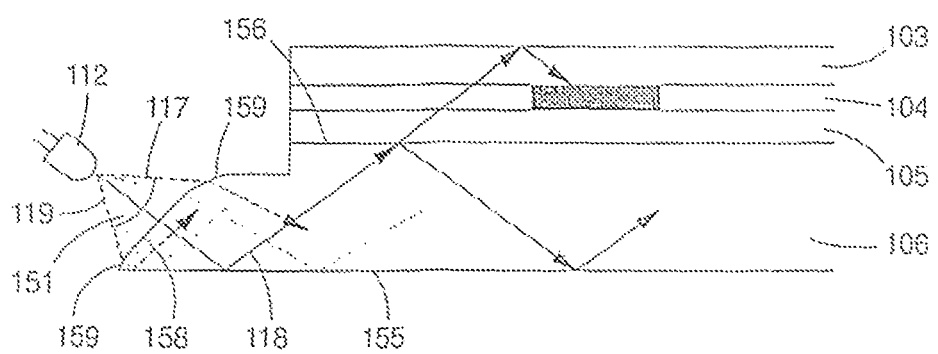

In order to couple the light from the light source 112 into the light guide 106 as effectively as possible and with high yield, it is advantageous to form the coupling-in surface correspondingly, in that the normal of the coupling-in surface lies parallel to the preferred direction 113, for example. Examples of particularly suitable coupling-in surfaces are represented in FIGS. 9A-9C. FIG. 9A shows a coupling-in surface 158 inclined at an angle 150 relative to the surface normal of the mirror layer 105 or respectively to the upper large face 156; the angle 150 preferably has a value of between 10° and 50°. The light source 112 is aligned at a corresponding angle, with the result that preferably at least the central beam 118 strikes the coupling-in surface 158 perpendicularly and strikes the upper large face 156— assuming an external medium with the refractive index of air instead of the mirror layer 105—at an angle necessary for total internal reflection. The angular range in which the light source 112 emits light is represented by the marginal beams 117 and 119 drawn as dashed lines. Whereas the central beam 118 strikes the contact surface 102 at an angle which is sufficient for total internal reflection, the marginal beam 117 shown in FIG. 9A is not totally internally reflected at the contact surface 102, whereas the marginal beam 119 is totally internally reflected. Portions of the light bundle with angles between the marginal beam 117 and the central beam 118 are therefore not totally internally reflected, and the aperture angle of the light bundle propagating in the light guide 106 is effectively limited in this way, even though the light source itself provides a larger aperture angle for the light emission. In the case of light sources which emit light in larger angular ranges, this leads to an improvement in the resolution of the system, but also to losses in intensity.

FIG. 9B shows a situation that is analogous to FIG. 9A in which the angle 150 has the same value, but a different sign than in FIG. 9A, as well as the corresponding beam path for the central beam 118 and the marginal beams 117 and 119. The light source 112 emits light in an angular range 151 in the sheet plane, i.e. in a plane perpendicular to the contact surface 102.

FIG. 9C shows a variation of the embodiment shown in FIG. 9B. The coupling-in surface 158 here is provided with chamfers 159 at its edges, which makes it possible to utilize the light emitted by the light source 112 more effectively. Whereas the normal of the coupling-in surface 158 lies parallel with the preferred direction 113 or the central beam 118, the chamfers 159 make an angle other than 0° and 180° with the coupling-in surface 158. It is thereby achieved that the marginal beams 117 and 119 are more strongly refracted on entry into the light guide 106 and the effective angular range of the illumination light is thus reduced. This leads to an improvement in the resolution of the whole system. Of course, it is also possible additionally to divide up the coupling-in surface 158 into further partial sections in each case tilted with respect to each other. It is also possible to divide it up into infinitesimally small surface sections; for example, the coupling-in surface 158 can also have a curvature.

Furthermore, there is also the possibility of reducing the angular range 151 in that diaphragms in the form of wide slots are attached to the coupling-in surface 158, and the distance from the light source 112 to the coupling-in surface 158 can be increased, however these measures are associated with a loss in irradiation intensity, which causes an unnecessary energy loss and shorter battery life, in particular in the case of mobile devices.

Figure 10:
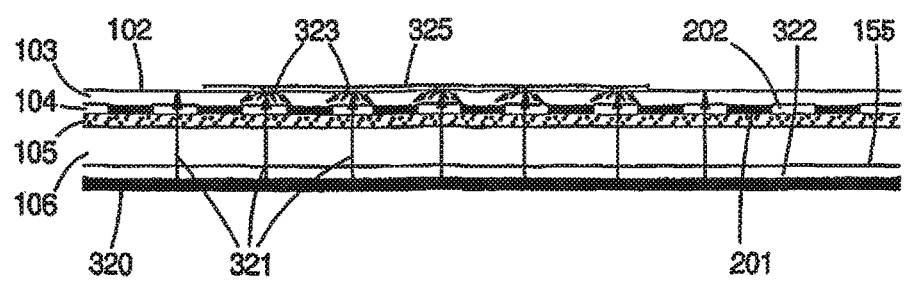

FIG. 10 finally shows a device in which an additional light source 320 emitting light in planar form is arranged below the lower large face 155 of the light guide 106, and is spaced apart from the lower large face 155 of the light guide 106 by an air layer 322. The illuminance of the additional light source 320 can be adapted to the degree of transmission of the homogenization means and can vary locally. It can furthermore advantageously emit light of at least two wavelength ranges, preferably not overlapping one another. One of the several wavelength ranges is advantageously adjacent to the wavelength range visible to the human eye, which allows the authentication of documents; a colored illumination is also advantageous, for which the additional light source 320 is preferably designed so as to emit light from a red, a blue and a green wavelength range. The wavelength ranges can be switched on. The additional light source 320 serves to capture objects other than areas of skin, for example flat documents 325. Objects which do not disturb the total internal reflection of the light emitted by the light source 112 and cannot thus generate an image of their texture on the sensor elements 201 or the sensor layer 104 can thus also be captured; it also serves to capture objects which generate double images on the sensor layer 104 in the case of illumination with the light source 112 due to their surface structure. In order to capture images with the additional light source 320, the light source 112 is preferably switched off. Light beams 321 emitted by the additional light source penetrate the light guide 106, the mirror layer 105, the passband areas 202 of the sensor layer 104 and the protective body 103, before they also pass through the contact surface 102. When they strike the object lying on the contact surface 102, here for example the document 325, the light beams 321 are back-scattered as scattered light 323, which strikes the light-sensitive sensor elements 201. The maximum resolution in the case of this imaging procedure is lower than in the case of the fingerprint capture by means of directed illumination through the light guide and depends on the thickness of the protective body. The thicker the protective body, i.e. the greater the distance between the light-sensitive sensor elements and the object to be captured, the lower the resolution of the system. In order to be able to resolve 300 ppi, this distance must not exceed a predefined value. If, for example, a thin glass with a refractive index of 1.5 is used as protective body, the distance must not be greater than approximately 50 µm. The maximum resolution generally depends on the refractive index of the protective body. The higher this refractive index, the higher the maximum resolution. The brightness of the additional light source 320 is expediently matched to the transmission of the corresponding areas of the mirror layer 105, with the result that an even illumination is achieved on the contact surface 102. The additional light source advantageously emits white light for the monochrome capture of an object. For the authentication of documents it is advantageous if the additional light source 320 can furthermore also emit light in a further spectrally limited wavelength range by switching, for example in an infrared or ultraviolet range adjacent to the visible wavelength range.

The additional light source 320 can additionally or alternatively also emit light sequentially or simultaneously in the limited wavelength ranges for red, green and blue light. With sequential illumination, an image can be captured in the three colors one after the other and these can be assembled to form a color image by corresponding image processing algorithms, as are known in the state of the art, when the sensor elements 201 record only the intensity. The illumination with the different wavelength ranges can also be effected simultaneously, wherein it is then necessary for the sensor elements 201 to be designed with corresponding sub-pixels which in each case detect only this wavelength range, and/or to be designed with different color filters, with the result that the different sub-pixels can in each case detect different wavelength ranges.

The additional light source 320 can furthermore also be used to display items of information on the contact surface which show a user directions for the use of the arrangement in the manner of operating instructions or additional items of information. For this the additional light source 320 must, however, consist of individually controllable elements, e.g. realized as a display.

With the previously described device it is possible to capture the prints of several fingers simultaneously with the same capture quality for all areas of skin due to the homogenization, wherein the device is constructed flat compared with other arrangements based on total internal reflection for capturing autopodia. Additionally, items of information such as for example user guidance or an evaluation can be displayed on the contact surface, which can also be used as a screen, and documents can be captured by means of the additional light source and checked for authenticity, for example with the aid of a comparison by means of connected databases.

LIST OF REFERENCE NUMBERS 101 finger
102 capture surface/contact surface
103 protective body
104 sensor layer
105 mirror layer
106 light guide
107 transmitted beam
108 reflected beam
109 scattering centre
110 papillary valley
111 papillary ridge
112 light source
113 preferred direction
114, 115, 116 reflected beam
117 marginal beam
118 central beam
119, 120 marginal beam
121 central beam
122 marginal beam
123 ambient light diaphragm layer
124 diaphragm layer
125 external light source
126 light beam
127, 128 scattered beam
129 light beam
130 ambient light diaphragm
131 spectral filter layer
132 pixel aperture diaphragm
135 light beam
136 light beam
137 ambient light
138 light beam
140 adhesive agent layer
142, 143 light beam
150 angle
151 angular range
152 aperture angle
153 angle of inclination
154 antireflection coating
155 lower large face
156 upper large face
157 LED
158 coupling-in surface
159 chamfer
160-167 light beam
201 sensor element
202 passband area
203 diaphragm aperture
207 transmitting area
208 reflecting area
300 end edge
301 absorber
302, 303 absorption layer
304 transparent compensation layer
305 absorber
320 additional light source
321 light beams
322 air layer
323 scattered light
325 document

The invention claimed is:

1. A device for the contact-based simultaneous capture of prints of several areas of skin of human autopodia supplied with blood, by means of disturbed total internal reflection, comprising, seen from the direction of an area of skin in contact:

a protective body of predefined thickness with a contact surface, wherein the contact surface has a size which makes possible the simultaneous placement of several autopodia;

a sensor layer, comprising light-sensitive sensor elements, arranged in the form of an array, for detecting light of at least one predefined wavelength range, wherein passband areas which are transparent for light of at least one predefined illumination wavelength range are arranged between the sensor elements;

a light guide made of a material that is transparent for light of the predefined illumination wavelength range, which is designed in the form of a plane-parallel plate, with a lower large face and an upper large face arranged parallel thereto which faces the sensor layer, as well as several edges connecting the large faces, wherein one of the edges is formed as a coupling-in surface for illumination light, a light source configured to emit illumination light along a longitudinal direction of the coupling-in surface, wherein the light source is designed to emit light in a limited angular range around a preferred direction, and the preferred direction makes an angle of incidence with the large faces and is predefined such that light which is emitted in the angular range would, after entering the light guide, be predominantly totally internally reflected at the large faces in the case of a medium with a refractive index of air in contact therewith;

a mirror layer arranged between the sensor layer and the light guide, the mirror layer configured to reflect one portion of the illumination light back into the light guide and transmit another portion of the illumination light, and configured to homogenize the illuminance of illumination light which exits the light guide through the upper large face thereof and strikes the contact surface, based on a distance to the light source.

2. The device according to claim 1, wherein the mirror layer is optically coupled to the sensor layer and the light guide, wherein a degree of reflection of the mirror layer decreases, and a degree of transmission increases, as distance from the light source increases.

3. The device according to claim 2, wherein the mirror layer comprises reflecting areas and transmitting areas, wherein a proportion of the reflecting areas per unit area decreases on average with distance from the light source and the proportion of the transmitting areas per unit area increases on average with the distance from the light source.

4. The device according to claim 3, wherein a density and/or size of the reflecting areas decreases as the distance from the light source increases, while the density and/or size of the transmitting areas increases.

5. The device according to claim 2, wherein a thickness of the mirror layer decreases with the distance from the light source.

6. The device according to claim 2, wherein a density of a material which essentially brings about the reflection at the mirror layer decreases as the distance from the light source increases.

7. The device according to claim 1, wherein a normal of the coupling-in surface lies parallel to the preferred direction.

8. The device according to claim 1, further comprising a suppressor for suppressing the formation of returning beams formed on an end edge of the light guide which lies opposite the coupling-in surface in a light propagation direction.

9. The device according to claim 8, wherein the end edge is provided with an absorption layer and/or is arranged substantially perpendicular to the propagation direction of light that has entered the light guide along the preferred direction and/or comprises several absorption surfaces provided with absorption layers, which, in pairs in each case, make angles other than 0° and 180° with each other, wherein the angles are predefined depending on the propagation direction of the light in such a way that the absorption is maximized.

10. The device according to claim 1, wherein the protective body is formed with a thickness of between 50 μm and 1000 μm and is optically coupled to the sensor layer.

11. The device according to claim 1, further comprising a diaphragm layer that is arranged between the contact surface and the sensor layer to suppress the detection of ambient light, wherein in each case a pixel aperture diaphragm is arranged above a sensor element, and/or a spectral filter layer, and/or the protective body is formed as a spectral filter layer.

12. The device according to claim 1, further comprising an additional light source emitting light in planar form arranged below the lower large face of the light guide, and spaced apart from the lower large face of the light guide by an air layer.

13. The device according to claim 12, wherein the illuminance of the additional light source is adapted to a degree of transmission of the mirror layer.

14. The device according to claim 12, wherein the additional light source is designed so as to emit light from at least two wavelength ranges not overlapping one another.

15. The device according to claim 14, wherein one of the at least two wavelength ranges is adjacent to a wavelength range visible to the human eye.

16. The device according to claim 14, wherein the additional light source is designed so as to emit light from a red, a blue and a green wavelength range, and light of these wavelength ranges can be switched on and off individually by a controller.

17. A device for the contact-based simultaneous capture of prints of several areas of skin of human autopodia supplied with blood, by means of disturbed total internal reflection, comprising, seen from the direction of an area of skin in contact:
  a protective body of predefined thickness with a contact surface, wherein the contact surface has a size which makes possible the simultaneous placement of several autopodia;
  a sensor layer, comprising light-sensitive sensor elements, arranged in the form of an array, for detecting light of at least one predefined wavelength range, wherein passband areas which are transparent for light of at least one predefined illumination wavelength range are arranged between the sensor elements;
  a light guide made of a material that is transparent for light of the predefined illumination wavelength range, which is designed in the form of a plane-parallel plate, with a lower large face and an upper large face arranged parallel thereto which faces the sensor layer, as well as several edges connecting the large faces, wherein one of the edges is formed as a coupling-in surface for illumination light,
  a light source configured to emit illumination light along a longitudinal direction of the coupling-in surface, wherein the light source is designed to emit light in a limited angular range around a preferred direction, and the preferred direction makes an angle of incidence with the large faces and is predefined such that light which is emitted in the angular range would, after entering the light guide, be predominantly totally internally reflected at the large faces in the case of a medium with a refractive index of air in contact therewith;
  a mirror layer arranged between the sensor layer and the light guide, the mirror layer configured to reflect one portion of the illumination light back into the light guide and transmit another portion of the illumination light; and
  a homogenizing structure located between the light source and the contact surface, the homogenizing structure configured to homogenize the illuminance of illumination light which exits the light guide through the upper large face thereof and strikes the contact surface, based on a distance to the light source.

18. The device according to claim 17, wherein the homogenizing structure comprises an absorption layer which is arranged between the mirror layer and the sensor layer or between the sensor elements in the passband areas, wherein as the distance from the light source increases a degree of absorption of the absorption layer for the illumination light decreases and a degree of transmission increases.

19. The device according to claim 17, wherein a normal of the coupling-in surface lies parallel to the preferred direction.

20. The device according to claim 17, further comprising a suppressor for suppressing the formation of returning beams formed on an end edge of the light guide which lies opposite the coupling-in surface in a light propagation direction.

21. The device according to claim 20, wherein the end edge is provided with an absorption layer and/or is arranged substantially perpendicular to the propagation direction of light that has entered the light guide along the preferred direction and/or comprises several absorption surfaces provided with absorption layers, which, in pairs in each case, make angles other than 0° and 180° with each other, wherein the angles are predefined depending on the propagation direction of the light in such a way that the absorption is maximized.

22. The device according to claim 17, wherein the protective body is formed with a thickness of between 50 μm and 1000 μm and is optically coupled to the sensor layer.

23. The device according to claim 17, further comprising a diaphragm layer that is arranged between the contact surface and the sensor layer to suppress the detection of ambient light, wherein in each case a pixel aperture diaphragm is arranged above a sensor element), and/or a spectral filter layer (131), and/or the protective body is formed as a spectral filter layer.

24. The device according to claim 17, further comprising an additional light source emitting light in planar form arranged below the lower large face of the light guide, and spaced apart from the lower large face of the light guide by an air layer.

25. The device according to claim 24, wherein the illuminance of the additional light source is adapted to a degree of transmission of the homogenizer.

26. The device according to claim 24, wherein the additional light source is designed so as to emit light from at least two wavelength ranges not overlapping one another.

27. The device according to claim 26, wherein one of the at least two wavelength ranges is adjacent to a wavelength range visible to the human eye.

28. The device according to claim 26, wherein the additional light source is designed so as to emit light from a red, a blue and a green wavelength range, and light of these wavelength ranges can be switched on and off individually by a controller.

29. A device for the contact-based simultaneous capture of prints of several areas of skin of human autopodia supplied with blood, by means of disturbed total internal reflection, comprising, seen from the direction of an area of skin in contact:
- a protective body of predefined thickness with a contact surface, wherein the contact surface has a size which makes possible the simultaneous placement of several autopodia;
- a sensor layer, comprising light-sensitive sensor elements, arranged in the form of an array, for detecting light of at least one predefined wavelength range, wherein passband areas which are transparent for light of at least one predefined illumination wavelength range are arranged between the sensor elements;
- a light guide made of a material that is transparent for light of the predefined illumination wavelength range, which is designed in the form of a plane-parallel plate, with a lower large face and an upper large face arranged parallel thereto which faces the sensor layer, as well as several edges connecting the large faces, wherein one of the edges is formed as a coupling-in surface for illumination light,
- a light source configured to emit illumination light along a longitudinal direction of the coupling-in surface, wherein the light source is designed to emit light in a limited angular range around a preferred direction, and the preferred direction makes an angle of incidence with the large faces and is predefined such that light which is emitted in the angular range would, after entering the light guide, be predominantly totally internally reflected at the large faces in the case of a medium with a refractive index of air in contact therewith;
- a mirror layer arranged between the sensor layer and the light guide, the mirror layer configured to reflect one portion of the illumination light back into the light guide and transmit another portion of the illumination light; and
- a homogenizing structure located between the light source and the contact surface, the homogenizing structure configured to homogenize a light quantity to be detected based on the illuminance of the illumination light from the protective body striking the contact surface, and on a distance to the light source.

30. The device according to claim 29, wherein the homogenizing structure comprises pixel aperture diaphragms arranged above the sensor elements, apertures of which increase as the distance from the light source increases.

31. The device according to claim 29, wherein the homogenizing structure comprises a controller for varying a sensitivity of the sensor elements.

32. The device according to claim 29, wherein a normal of the coupling-in surface lies parallel to the preferred direction.

33. The device according to claim 29, further comprising a suppressor for suppressing the formation of returning beams formed on an end edge of the light guide which lies opposite the coupling-in surface in a light propagation direction.

34. The device according to claim 33, wherein the end edge is provided with an absorption layer and/or is arranged substantially perpendicular to the propagation direction of light that has entered the light guide along the preferred direction and/or comprises several absorption surfaces provided with absorption layers, which, in pairs in each case, make angles other than 0° and 180° with each other, wherein the angles are predefined depending on the propagation direction of the light in such a way that the absorption is maximized.

35. The device according to claim 29, wherein the protective body is formed with a thickness of between 50 μm and 1000 μm and is optically coupled to the sensor layer.

36. The device according to claim 29, further comprising a diaphragm layer that is arranged between the contact surface and the sensor layer to suppress the detection of ambient light, wherein in each case a pixel aperture diaphragm is arranged above a sensor element), and/or a spectral filter layer, and/or the protective body is formed as a spectral filter layer.

37. The device according to claim 29, further comprising an additional light source emitting light in planar form arranged below the lower large face of the light guide, and spaced apart from the lower large face of the light guide by an air layer.

38. The device according to claim 37, wherein the illuminance of the additional light source is adapted to a degree of transmission of the homogenizer.

39. The device according to claim 37, wherein the additional light source is designed so as to emit light from at least two wavelength ranges not overlapping one another.

40. The device according to claim 39, wherein one of the at least two wavelength ranges is adjacent to a wavelength range visible to the human eye.

41. The device according to claim 39, wherein the additional light source is designed so as to emit light from a red, a blue and a green wavelength range, and light of these wavelength ranges can be switched on and off individually by a controller.

* * * * *